(12) United States Patent
Nagai et al.

(10) Patent No.: US 7,876,406 B2
(45) Date of Patent: Jan. 25, 2011

(54) TRANSFLECTIVE LIQUID CRYSTAL DISPLAY DEVICE

(75) Inventors: Hiroshi Nagai, Kanagawa (JP);
Michiaki Sakamoto, Kanagawa (JP);
Kenichirou Naka, Kanagawa (JP);
Kenichi Mori, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 480 days.

(21) Appl. No.: 12/060,708

(22) Filed: Apr. 1, 2008

(65) Prior Publication Data

US 2008/0239178 A1    Oct. 2, 2008

(30) Foreign Application Priority Data

Apr. 2, 2007    (JP) .............................. 2007-096749

(51) Int. Cl.
*G02F 1/1335* (2006.01)
*G02F 1/1343* (2006.01)
*G02F 1/1337* (2006.01)

(52) U.S. Cl. ...................... 349/114; 349/141; 349/117; 349/124

(58) Field of Classification Search ................. 349/114, 349/141, 117, 124, 33, 96
See application file for complete search history.

(56) References Cited

U.S. PATENT DOCUMENTS 6,914,656 B2 *  7/2005  Sakamoto et al. ........... 349/141

2006/0023146 A1*  2/2006  Yang et al. ................... 349/114
2010/0110351 A1*  5/2010  Kim et al. .................... 349/114

FOREIGN PATENT DOCUMENTS

JP    2003-344837 A    12/2003

OTHER PUBLICATIONS

P-97: A Novel Transflective Display Associated with Fringe-Field Switching, T.B. Jung and S.H. Lee et al. [SID 03 Digest, 592], 2003.
P-159: A Single Gap Transflective Fringe-Field Switching Display, E. Jeong, M. O. Choi, Y. J. Li, Y. H. Jeong, H. Y. Kim, S. Y. Kim and S. H. Lee [SID 06 Digest, 810], 2006.

* cited by examiner

*Primary Examiner*—Mike Qi
(74) *Attorney, Agent, or Firm*—Sughrue Mion, PLLC

(57) ABSTRACT

A transflective LCD includes a LC layer sandwiched between a pair of substrates, and a pair of polarizing films. The LCD device includes a reflection area and a transmission area in each pixel, the transmission area having a reflection film. A retardation film has a first portion in the refection area between the reflection film and the LC layer, and a second portion in the transmission area between the LC layer and the rear polarizing film. The retardation film has a slow axis perpendicular to an initial orientation direction of the LC molecules upon absence of an applied voltage and perpendicular or parallel to the optical axis of the front polarizing film. The orientation of the LC molecules upon display of a dark state has a direction different between the reflection area and the transmission area.

19 Claims, 33 Drawing Sheets

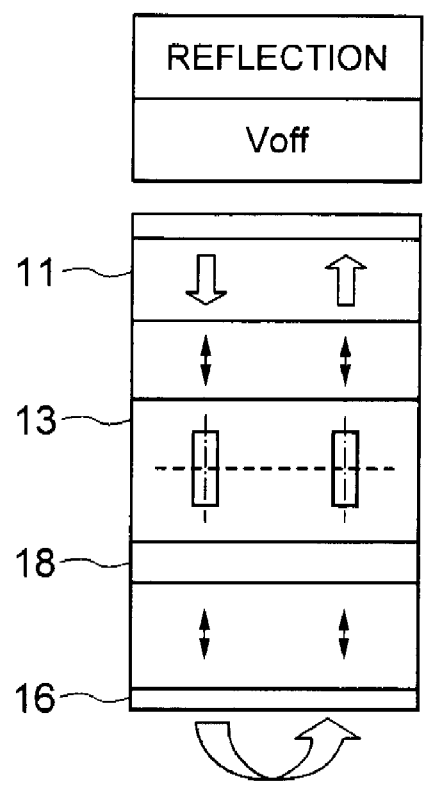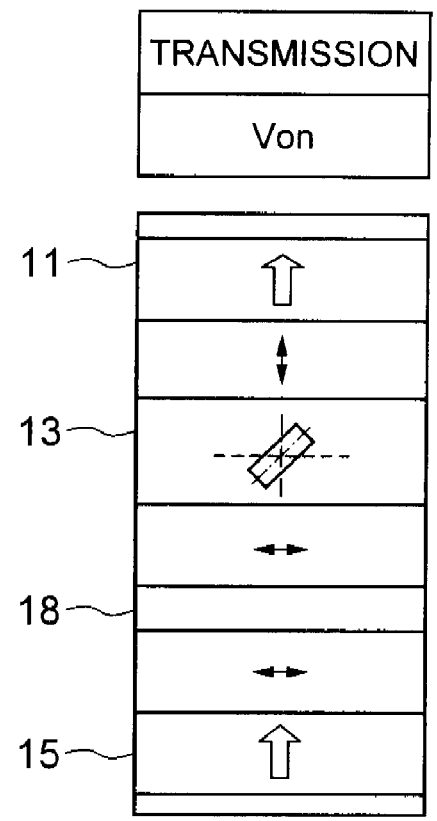

21 REFLECTION AREA

22 TRANSMISSION AREA

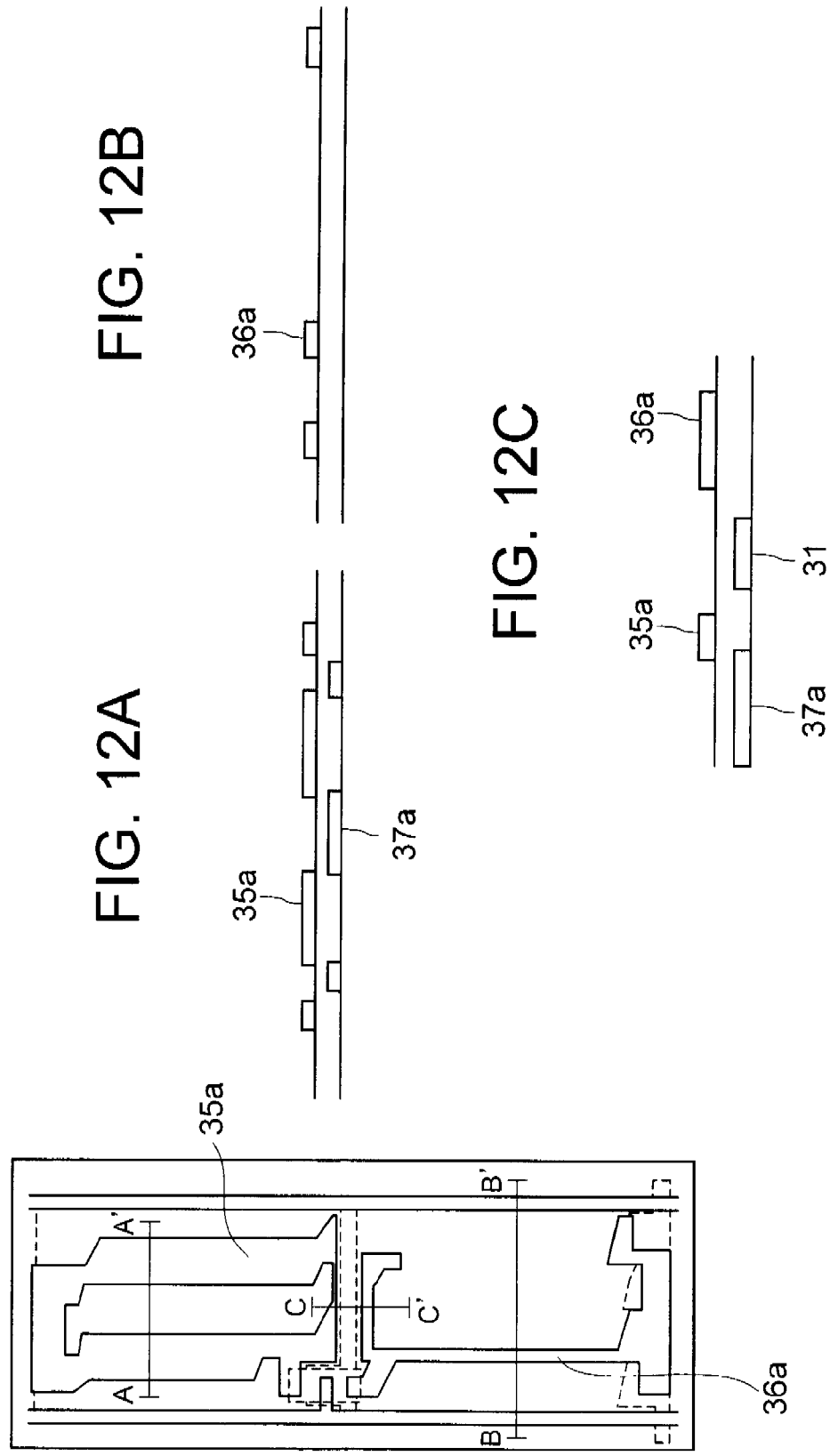

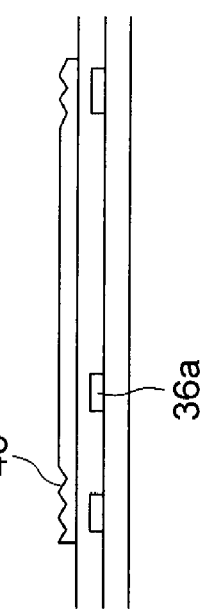
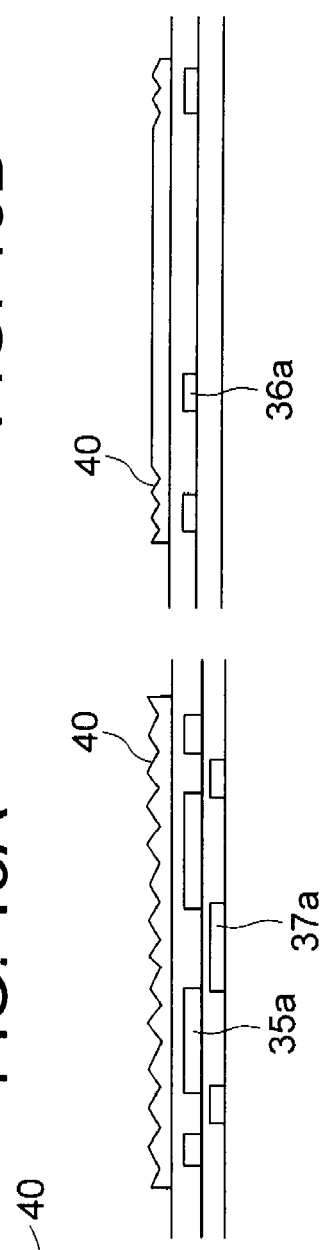
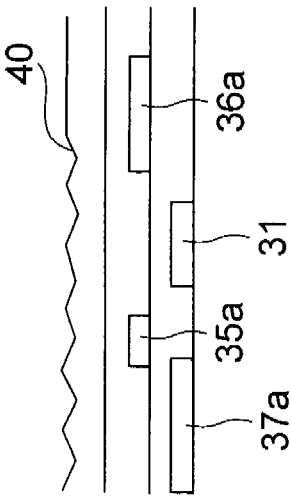
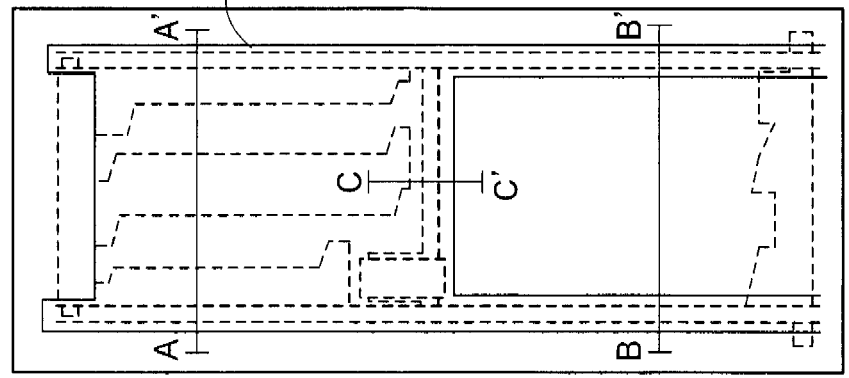

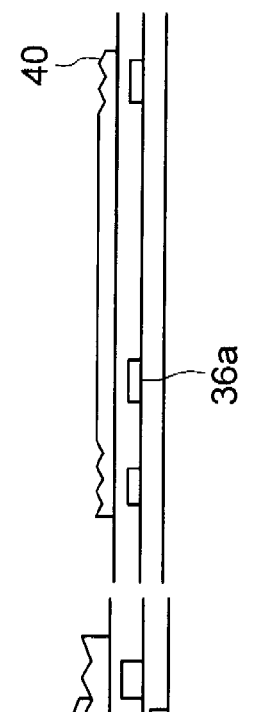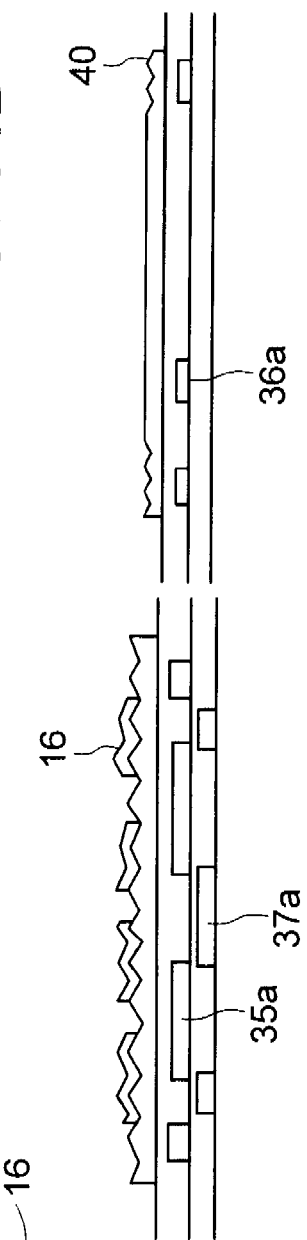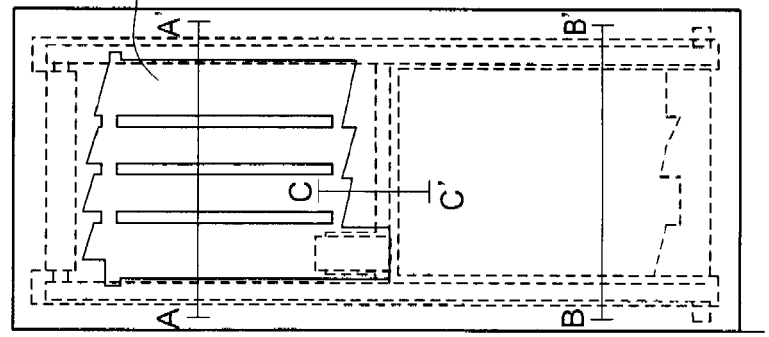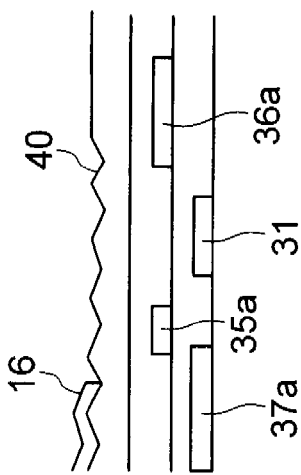

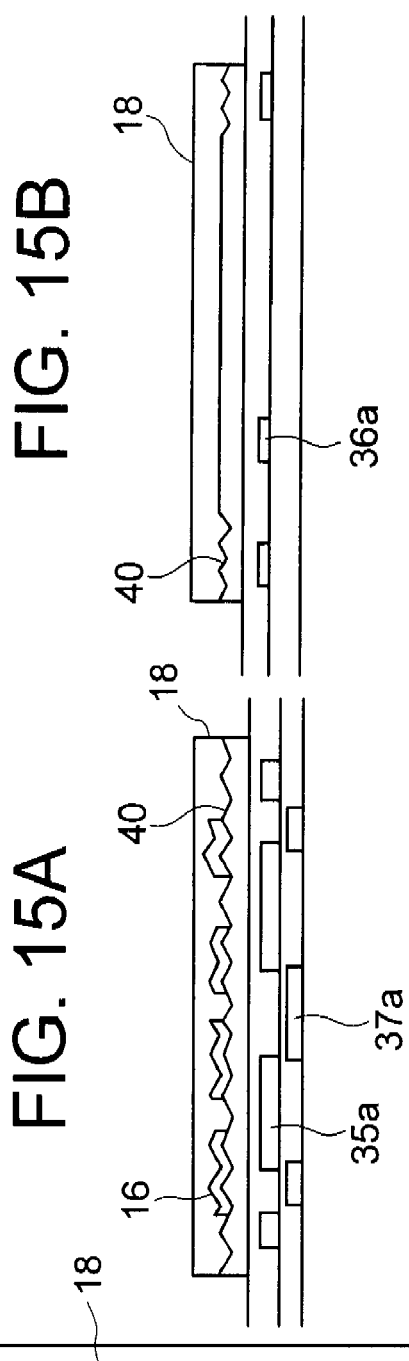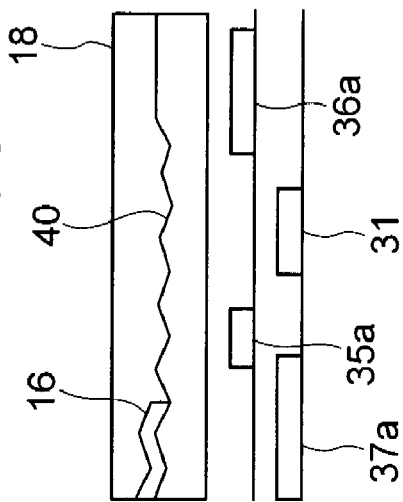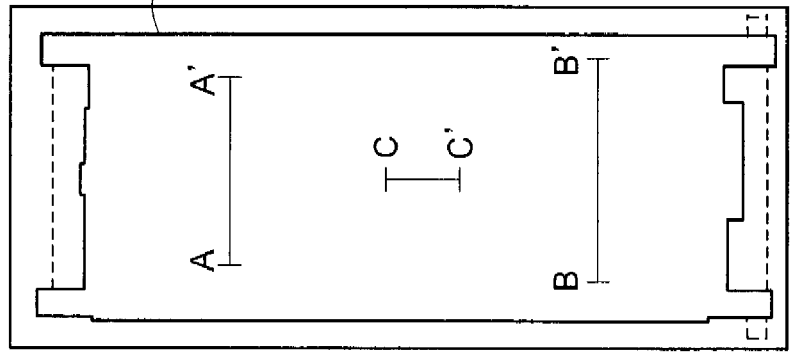

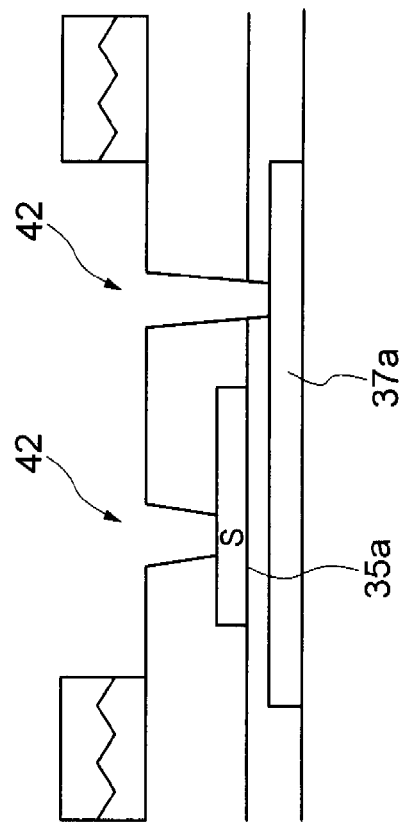
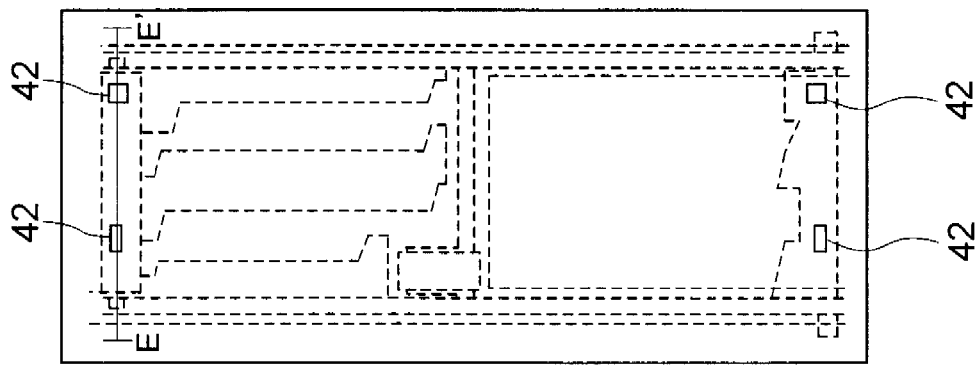

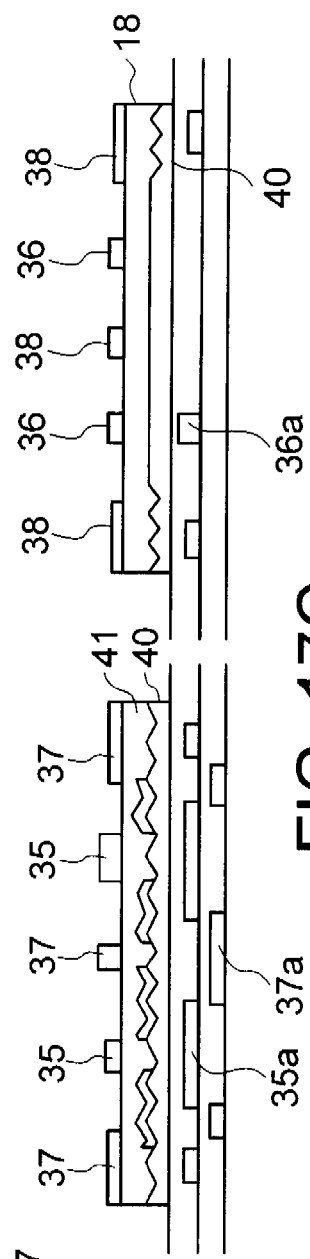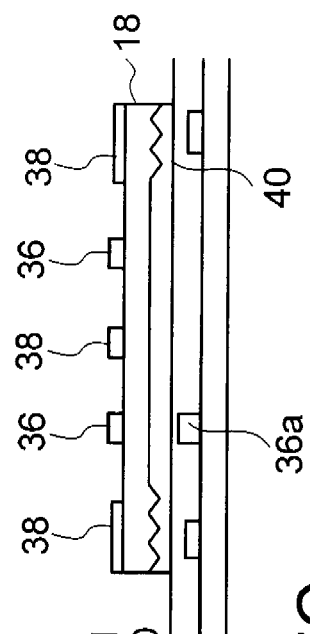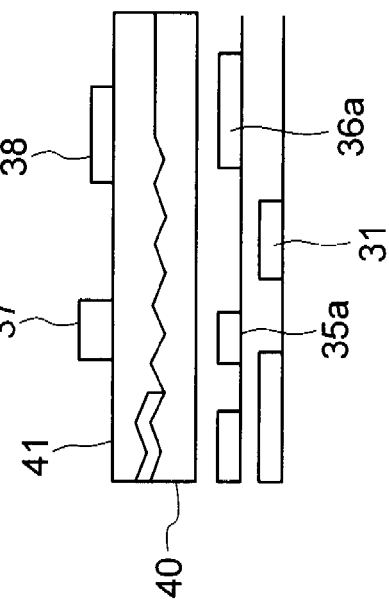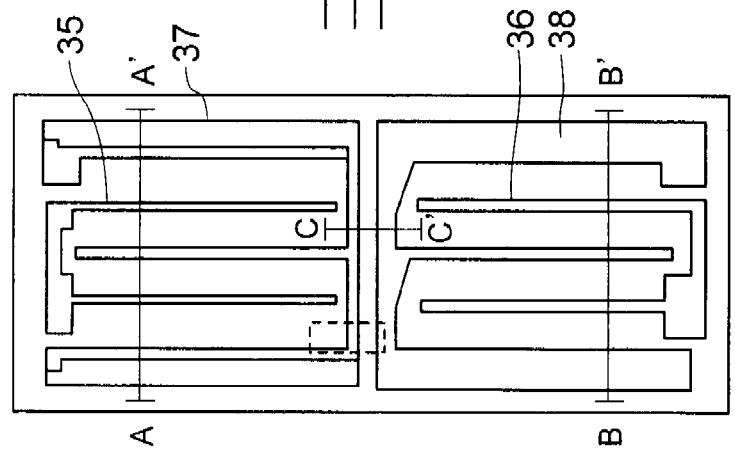

FIG. 28

|  | TRANSMISSION | EX1-1 | EX1-2 | EX4 | EX5 | EX6 |
|---|---|---|---|---|---|---|
| POLARIZING FILM 11 | 90° | 90° | 0° | 0° | 0° | 0° |
| PROTECTION LAYER | TAC | TAC | TAC | TAC | ISOTROPIC | ISOTROPIC |
| LC LAYER 13 | 90° | 90° | 90° | 90° | 90° | 90° |
| RETARDATION FILM 18 | — | 0° | 0° | 0° | 0° | 0° |
| RETARDATION FILM 19 | — | — | — | — | — | PERPENDICULAR |
| POLARIZING FILM 15 | 0° | 0° | 90° | 90° | 90° | 90° |
| PROTECTION LAYER | TAC | TAC | TAC | ISOTROPIC | ISOTROPIC | ISOTROPIC |

FIG. 33

TABLE-1

| | | | | | | | | | | | | | | |
|---|---|---|---|---|---|---|---|---|---|---|---|---|---|---|
| TRANSMISSION GSL | 0 | ... | 7 | ... | 15 | ... | 29 | ... | 31 | ... | 39 | ... | 47 | ... | 55 | ... | 63 |
| REFLECTION GSL | 63 | ... | 60 | ... | 56 | ... | 52 | ... | 48 | ... | 40 | ... | 32 | ... | 24 | ... | 0 |

TRANSFLECTIVE LIQUID CRYSTAL DISPLAY DEVICE

This application is based upon and claims the benefit of priority from Japanese patent application No. 2007-096749 filed on Apr. 2, 2007, the disclosure of which is incorporated herein in its entirety by reference.

BACKGROUND OF THE INVENTION

1. Field of the Invention

The present invention relates to a transflective liquid crystal display (LCD) device. More particularly, the present invention relates to a transflective LCD device having a reflection area and a transmission area for a liquid crystal (LC) layer, and adapted to be driven in an in-plane-switching (IPS) mode.

2. Description of the Related Art

LCD devices are roughly classified into a transmissive type and a reflective type in terms of the light used therein. Generally, transmissive LCD devices have a backlight source, and display an image by controlling the rate of transmission of the light emitted by the backlight source. On the other hand, reflective LCD devices have a reflection film and utilize the light reflected by the reflection film to display the image. Since the reflective LCD devices do not require any backlight source, the reflective LCD devices have an advantage over the transmissive LCD devices in terms of the power dissipation, thickness and weight of the device. However, since the reflective LCD devices utilize the ambient light as the light source thereof, the reflective LCD devices have a disadvantage in that the reflective LCD devices have a poor visibility in a dark environment.

Transflective LCD devices are known as a LCD device having both the advantages of the transmissive LCD devices and those of the reflective LCD devices (refer to Patent Publication JP-2003-344837A). The transflective LCD device has a transmission area and a reflection area in each pixel. The transmission area transmits the light from the backlight source disposed rear side of the LCD device and utilizes the backlight source as a display light source. The reflection area has a reflection film and utilizes the external light incident from the front side of the LCD device and reflected by the reflection film as a display light source. The transflective LCD device turns OFF the backlight source when it is situated in a bright ambient and displays the image by means of the reflection area to reduce the power dissipation of the LCD device. The transflective LCD device turns ON the backlight source when it is situated in a dark environment and displays the image by means of the transmission area so that it can clearly display the image in the dark environment.

The display modes of the LCD devices include the IPS mode as described above, which includes a lateral-electric-field drive mode and a fringe-field drive (FFD) mode. A LCD device adapted to operate in the IPS mode has a pixel electrode and a common electrode provided on the same substrate and applies an electric field to the LC layer in the lateral direction. The IPS-mode LCD device can realize a wider viewing angle compared to a twisted-nematic mode (TN-mode) LCD device by using a technique wherein the LC molecules in the LCD layer are rotated or turned in the direction parallel to the substrate.

Assuming that the IPS mode is adopted as the display mode for the transflective LCD device, there arises a problem in that the transmission area assumes a normally white mode if the reflection area assumes a normally black mode, whereby the image in the both areas is reversed. For a countermeasure of this problem, a technique for inserting a retardation film between a LC cell including the LC layer and a polarizing film has been adopted in the transflective LCD device (refer to non-patent publication-1: P-97: A Novel Transflective Display Associated with Fringe-Field Switching, T. B. Jung and S. H. Lee et al. [SID 03 DIGEST, 592], and non-patent publication-2: P-159: A Single Gap Transflective Fringe-Field Switching Display, E. Jeong, M. O. Choi, Y. J. Li, Y. H. Jeong, H. Y. Kim, S. Y. Kim and S. H. Lee [SID 06 DIGEST, 810]).

In the above technique, the slow axis of the inserted retardation film is arranged to have a significant angle with respect to a linearly-polarized light incident to the transflective LCD device. This arrangement results in a problem that the contrast ratio of the displayed image is degraded by deviation of the retardation value due to the range of variation in the thickness of the retardation film. There may arise another problem in that the viewing angle dependency of the retardation film degrades the viewing angle characteristic of the LCD device.

SUMMARY OF THE INVENTION

It is therefore an object of the present invention to provide a transflective LCD device that can solve or alleviate the problems that the contrast ratio of the displayed image is degraded by the deviation of retardation of the retardation film and that the viewing angle dependency of the retardation film degrades the viewing angle characteristic.

The present invention provides a transflective liquid crystal display (LCD) device including: a liquid crystal (LC) cell including a LC layer including therein LC molecules homogeneously oriented and a pair of transparent substrates sandwiching therebetween the LC layer to define an array of pixels, each of the pixels including a transmission area and a reflection area juxtaposed each other; first and second polarizing films sandwiching therebetween the LC cell, the first polarizing film being disposed at a front side of the LC cell and having an optical axis perpendicular to an optical axis of the second retardation film disposed at a rear side of the LC cell; a reflection film disposed in the reflection area at a rear side of the LC layer; and a retardation film including a first portion disposed in the reflection area between the reflection film and the LC layer, and a second portion disposed in the transmission area between the LC layer and the second polarizing film, the retardation film having a slow axis perpendicular to an initial orientation direction of the LC molecules upon absence of an applied voltage, the slow axis being perpendicular or parallel to the optical axis of the first polarizing film, wherein an orientation of the LC molecules upon display of a dark state has a direction which is different between the reflection area and the transmission area.

The above and other objects, features and advantages of the present invention will be more apparent from the following description, referring to the accompanying drawings.

BRIEF DESCRIPTION OF THE DRAWINGS

FIGS. 6A and 6B are a schematic illustration of polarized state in the reflection area and transmission area, respectively, obtained by the drive signal shown in FIGS. 5A and 5B;

FIGS. 10 to 17 are a schematic top plan view of a TFT substrate in consecutive steps of a process for manufacturing the same, wherein each of FIGS. 10 to 17 is attached with one or a plurality of sectional views taken in the corresponding figure, the sectional views being specified by a corresponding drawing number and a suffix attached thereto, the suffix including A, B, C, D and E corresponding to the line A-A', B-B', C-C', D-D' and E-E', respectively, taken in the corresponding figure to show the sectional views;

FIG. 28 is a table showing a combination of some of the constituent elements and the parameters thereof in examples of the LCD device of the present invention;

FIG. 33 is a lookup table for conversion of gray-scale level.

DETAILED DESCRIPTION OF THE INVENTION

Figure 1:
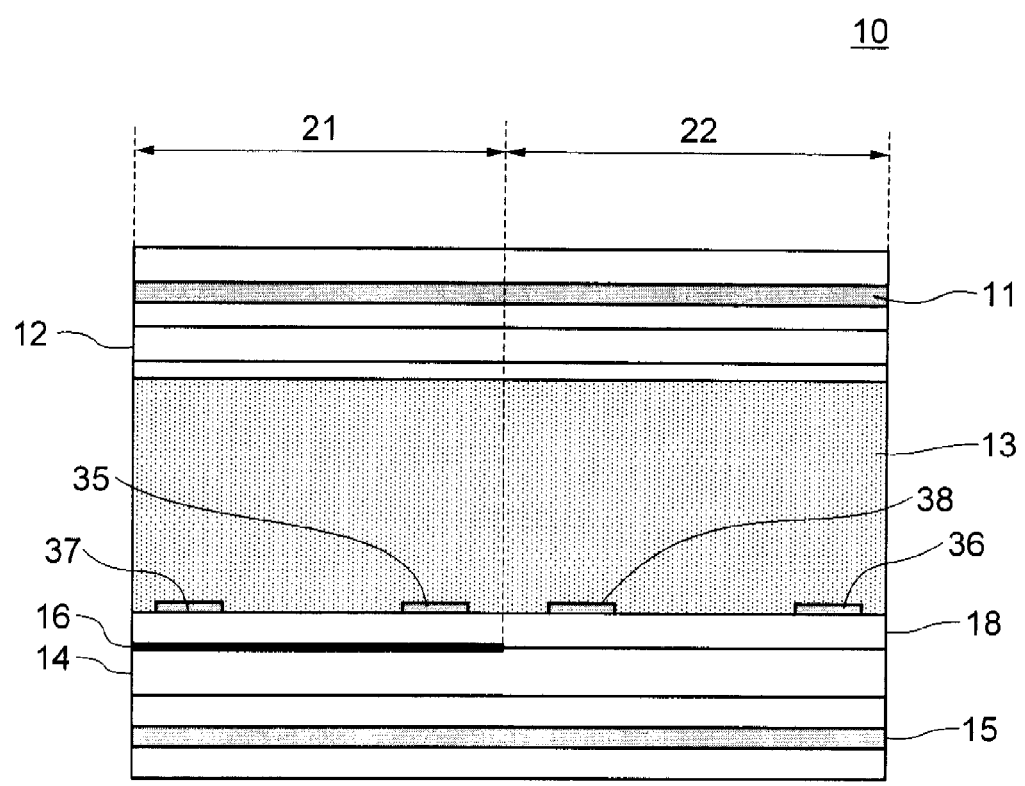
FIG. 1 is a schematic sectional view of a single pixel in a LCD device according to a first embodiment of the present invention.

Now, the present invention will be described in greater detail with reference to the accompanying drawings that illustrate exemplary embodiments of the present invention. FIG. 1 is a schematic sectional view of a pixel in a LCD device according to a first embodiment of the present invention. In FIG. 1, the LCD device 10 includes, in each pixel thereof, a first polarizing film 11, a counter substrate, a LC layer 13, a retardation film 18, a TFT substrate 14 and a second polarizing film 15, which are arranged in this order form the front side to the rear side of the LCD device 10. The LCD device 10 is configured as a transflective LCD device including therein an array of pixels each having a reflection area 21 and a transmission area 22. The LCD device 10 of the present embodiment is typically used as a multi-purpose potable terminal that may be configured as a portable phone, a digital camera, a TV set or a PDA (portable data assistant).

A reflection film 16 is formed in the reflection area 21 between the second polarizing film 15 and the LC layer 13 in order to reflect the light incident thereto through the first polarizing film 11. The reflection film 16 may have any configuration so long as the reflection film reflects the light incident thereto through the first polarizing film 11. However, the reflection film 16 typically has a concave-and-convex surface in order to enhance the light scattering performance. A retardation film 18 is sandwiched between the reflection film 16 and the LC layer 13. The retardation film 18 covers the entire surface of the TFT substrate 14, and is located between the second polarizing film 15 and the LC layer 13 in the transmission area 22 of the LCD device 10. The retardation film 18 is typically formed from a LC polymer on the substrate, although some other materials may be used so long as the materials can be oriented in a desired direction and provide a desired degree of retardation.

In the reflection area 21, there are provided a pixel electrode 35 for driving the LC molecules in the reflection area 21 and a common electrode (first common electrode) 37 for providing the reflection area 21 with a reference potential, which are formed on the retardation film 18. In the transmission area 22, there are provided a pixel electrode 36 for driving the LC molecules in the transmission area 22 and a common electrode (second common electrode) 38 for providing the transmission area 22 with a reference potential, which are formed on the retardation film 18. The reflection area 21 uses the light incident into the pixel through the counter substrate 12 and reflected by the reflection film 16 as a display light source. The transmission area 22 uses a backlight source (not shown) that is disposed at the rear side of the LC panel and irradiates the light through the second polarizing film 15 to function as a display light source.

The thickness of the LC layer 13 is adjusted so as to generate a retardation of $\lambda/2$ for a light having a wavelength of 550 nm, as by calculating on the basis of the refractive index of the LC material. It should be noted that the $\lambda/2$ is a theoretical value and, in reality, it is typically adjusted to produce a retardation of $(\lambda/2)+\alpha$. This is because, whereas LC molecules are driven to rotate in the central portion of the cell gap, the rotation of the other LC molecules located in the vicinity of the substrates is suppressed so that the effective retardation assumes $\lambda/2$ when the retardation is set equal to $(\lambda/2)+\alpha$. For example, if the retardation of the LC layer 13 is set at $\Delta nd=300$ nm, the effective retardation assumes $\Delta nd_{eff}=\lambda/2=550/2=275$ nm.

The retardation of the retardation film 18 is set at λ/4. The arrangement of the polarization axis (either light transmission axis or light absorption axis) of each of the polarizing films 11, 15, direction of the orientation (optical axis) of the LC molecules in the LC layer 113 and the direction of the slow axis of the retardation film 18 is such that the linearly-polarized light emitted from the backlight source and transmitted through the second polarizing film 15 remains as the linearly-polarized light and the polarization direction thereof matches with the light absorption axis of the first polarizing film 11, upon incidence of the linearly-polarized light onto the first polarizing film 11 after passing through the retardation film 18 and LC layer 13. More specifically, the polarization axis of the first polarizing film 11 and the polarization axis of the second polarizing film 15 are perpendicular to each other, and the polarization axis of the second polarizing film 15 and the slow axis of the retardation film 18 are perpendicular or parallel to each other, whereas the orientation direction of the LC molecules and the slow axis of the retardation film 18 are perpendicular to each other upon absence of an applied voltage.

In the LCD device of the related art having a pair of retardation films (¼ wavelength films) on the opposite sides of the LC layer, the slow axis of the retardation films and the polarizing axis of the light-incident-side polarizing film, which corresponds to the second polarizing film 15, are neither parallel nor perpendicular to each other, if the light incident onto the light-exiting-side polarizing film, which corresponds to the first polarizing film 11, from the LC layer is set to assume a linearly-polarized light. In this case, the light incident onto the light-exiting-side polarizing film does not assume a perfect linearly-polarized light, because the linearly-polarized light is converted into an elliptically-polarized light, particularly in an oblique viewing angle, although a linearly-polarized light should be converted into a circularly-polarized light and a circularly-polarized light should be converted into a linearly-polarized light. This causes a poor contrast ratio in the transmission area of the LCD device.

On the other hand, in the present embodiment, upon absence of an applied voltage to the transmission area 22, the orientation direction of the LC molecules in the LC layer 13 is arranged perpendicular to the slow axis of the retardation film 18, and the angle between the polarization direction of the linearly-polarized light incident onto the retardation film 18 and the slow axis of the retardation film 18 is set equal to 0 degree or 90 degrees. In this configuration, the light incident from the second polarizing film 15 is transmitted through the retardation film 18 and LC layer 13 and remains as a linearly-polarized light, to thereby prevent degradation of the contrast ratio in the transmission area 22.

Figure 2:
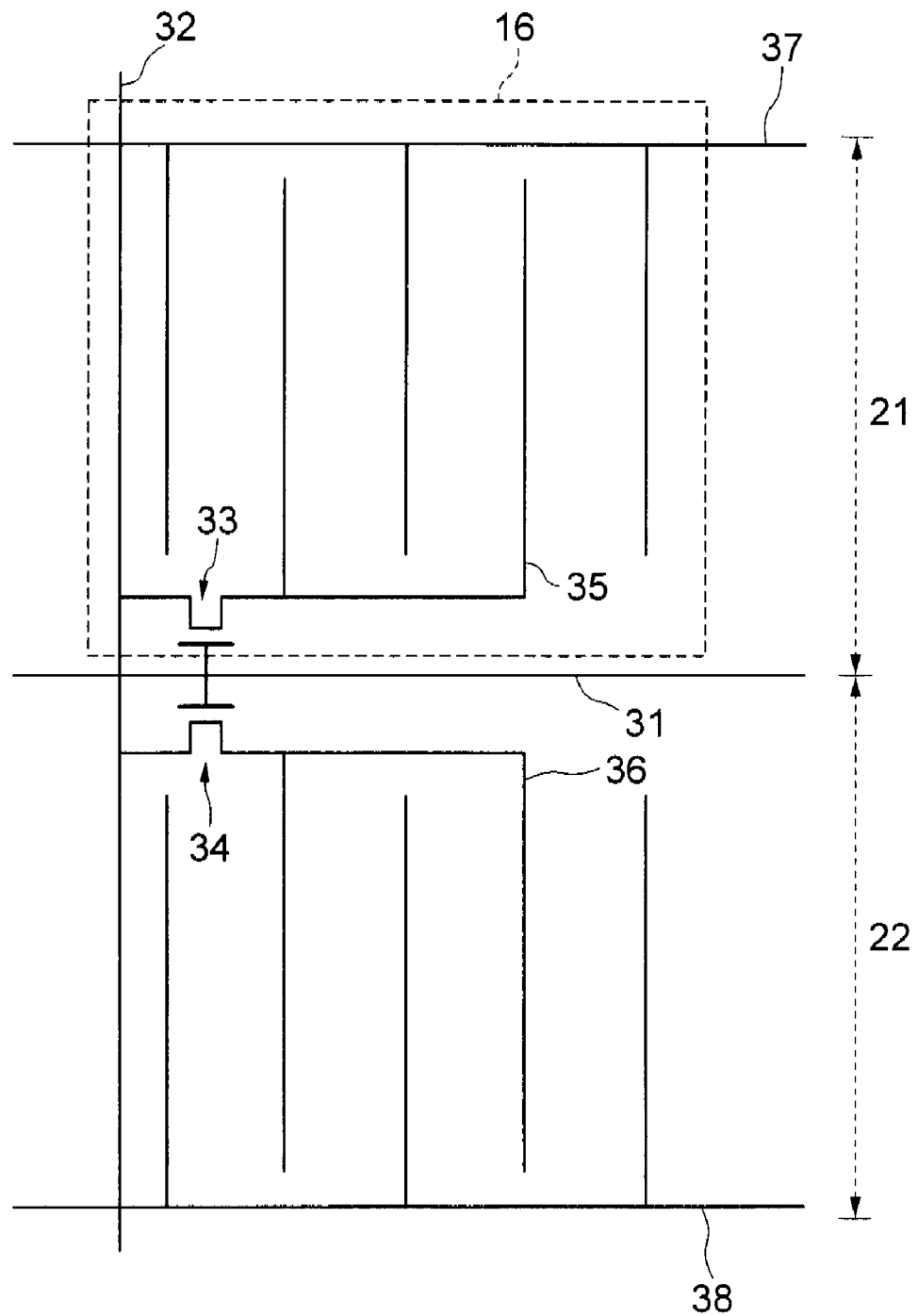
FIG. 2 is a schematic illustration of the electric connection in the single pixel of the TFT substrate in the LCD device of FIG. 1.

FIG. 2 is a schematic illustration of a single pixel formed on the TFT substrate 14. A gate line 31 and a data line 32 are formed on the TFT substrate 14 and arranged perpendicular to each other. TFTs 33 and 34 are disposed in the vicinity of intersection between the gate line 31 and the data line 32 for the reflection area 21 and transmission area 22, respectively. Each of the TFTs 33 and 34 includes a gate electrode connected to the gate line 31, source and drain electrodes, one of which is connected to the data line 32 and the other is connected to a corresponding one of the pixel electrode 35 in the reflection area 21 and the pixel electrode 36 in the transmission area 22. In this embodiment, the TFTs 33 and 34 are connected to the same gate line 31 and the same data line 32 from the viewpoint of efficient arrangement of the TFTs on the transparent substrate in FIG. 2. However, the TFTs 33 and 34 may be connected to different gate lines and different data lines.

The first common electrode 37 and second common electrode 38 are provided to the reflection area 21 and transmission area 22, respectively, of the pixel. Each of the first common electrode 37 and second common electrode 38 has an extension extending parallel to the gate line 31 and a projection projecting to the display area of the pixel. A drive signal having a specific waveform that is common to all the pixels in the LCD device 10 is supplied to each of the first common electrode 37 and the second common electrode 38. The first common electrode 37 is disposed to oppose the pixel electrode 35 in the reflection area 21 within the plane parallel to the substrate surface, whereas the second common electrode 38 is disposed to oppose the pixel electrode 36 in the transmission area 22 within the plane parallel to the substrate surface.

The orientation of LC molecules in the LC layer 13 in the reflection area 21 is controlled by the electric field that corresponds to the potential difference between the pixel electrode 35 and the first common electrode 37. The orientation of LC molecules in the LC layer 13 in the transmission area 22 is controlled by an electric field that corresponds to the potential difference between the pixel electrode 36 and the second common electrode 38. For example, the gap between the pixel electrode 35 and the first common electrode 37 in the reflection area 21 is designed so as to allow the LC molecules in the LC layer 13 to rotate by about 22.5 degrees (between 20 degrees and 25 degrees) when a potential difference of 5V is applied. On the other hand, the gap between the pixel electrode 36 and the second common electrode 38 in the transmission area 22 is designed so as to allow the LC molecules in the LC layer 13 to rotate by about 45 degrees when a potential difference of 5V is applied.

Figure 3A:
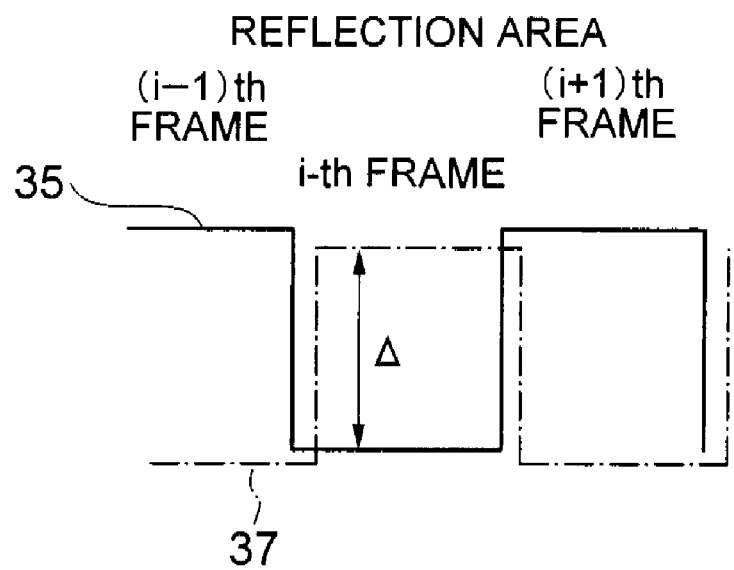
FIGS. 3A and 3B are a timing chart illustrating an example the waveform of a drive signal applied in the reflection area and the transmission area, respectively.
Figure 3B:
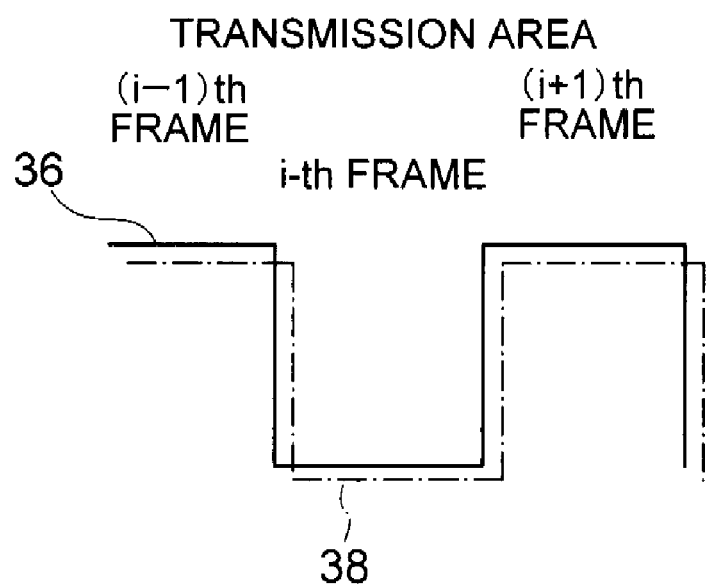

FIG. 3A is a timing chart showing the waveform of the drive signal applied to the reflection area 2, and FIG. 3B is a timing chart showing the waveform of the drive signal applied to the transmission area 22, both in a specific time period. Typically, the common-electrode signal applied to the first common electrode 37 of each pixel is inverted in a row-by-row basis and also inverted in a frame-by-frame basis, assuming that a gate-line-inversion drive scheme is employed. As shown in FIG. 3A, the electric potential applied to the first common electrode 37 is inverted from 0V to 5V and vice versa on a frame-by-frame basis for each of the pixels of the LCD device 10. Similarly, the electric potential applied to the second common electrode 38 is inverted from 0V to 5V and vice versa as in the case of the first common electrode 37. The electric potential applied to the second common electrode 38 is obtained by inverting the electric potential applied to the first common electrode 37. Thus, the electric potential of the second common electrode 38 is 0V when the electric potential of the first common electrode 37 is 5V, whereas the electric potential of the second common electrode 38 is 5V when the electric potential of the first common electrode 37 is 0V.

An appropriate pixel signal between 0V and 5V is applied to the pixel electrodes 35 and 36. Since the TFTs 33 and 34 are connected to the same data line 32, a pixel signal is applied to the pixel electrodes 35 and 36 in common. When a data signal of 0V is supplied to the pixel electrode 35 and a common-electrode signal of 5V is applied to the first common electrode 37 for the i-th frame, as shown in FIG. 3A, the potential difference (ΔV) between the pixel electrode 35 and the first common electrode 37 is 5V, whereby the LC layer 13 is driven by the electric field generated by the potential difference of 5V in the reflection area 21. At this stage, a common-electrode signal of 0V is applied to the second common electrode 38 and hence the potential difference (ΔV) between the pixel electrode 36 and the second common electrode 38 is 0V.

Figure 4A:
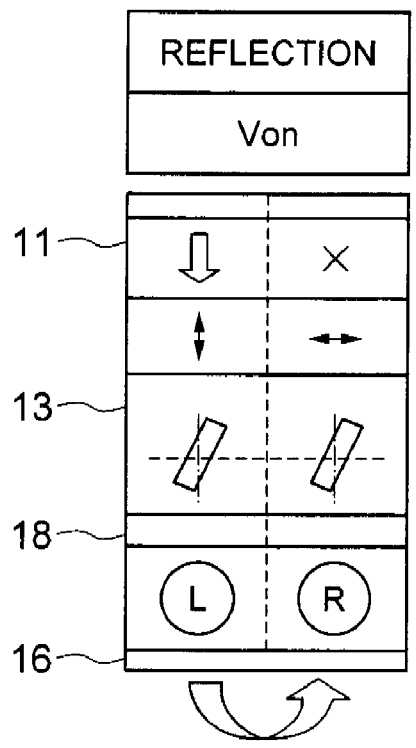
FIGS. 4A and 4B are a schematic illustration of polarized state in the reflection area and transmission area, respectively, obtained by the drive signal shown in FIGS. 3A and 3B.
Figure 4B:
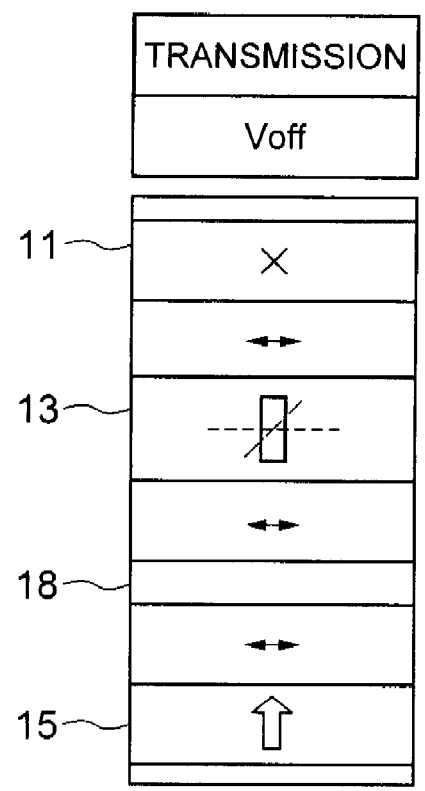

FIGS. 4A and 4B show the way in which the light is polarized in the reflection area 21 and in the transmission area 22, respectively, assuming that the signals shown in FIGS. 3A and 3B are applied to both the areas 21 and 22. In the following description, it is assumed that the transmission axis of the first polarizing film 11 is at 90 degrees and the direction of initial orientation of the LC molecules in the LC layer 13 is at 90 degrees, whereas both the direction of the slow axis of the retardation film 18 and transmission axis of the second polarizing film 15 are at 0 degree. The orientation direction of the LC molecules in the LC layer 13 is rotated or turned by about 22.5 degrees in the reflection area 21 when the signal shown in FIG. 3A is applied. In this case, as shown in FIG. 4A, in the reflection area 21, the linearly-polarized light incident from the outside and having a polarization direction of 90 degrees in the longitudinal direction is changed, after passing through the LC layer 13, to assume a linearly-polarized light having a polarization direction of 45 degrees.

The linearly polarized light having a polarization direction of 45 degrees after passing through the LC layer 13 has a polarization angle of 45 degrees with respect to the slow axis of the retardation film 18, and the retardation of the retardation film 18 is λ/4. Accordingly, the polarization state thereof is changed after the polarized light is passed by the retardation film 18 and exits the retardation film 18 as a counterclockwise-circularly-polarized light, which is marked by L encircled in the figure. The counterclockwise-circularly-polarized light is changed to assume a clockwise-circularly-polarized light, which is marked by R encircled in the figure, after being reflected by the reflection film 16. Thereafter, the light is passed again by the retardation film 18 to assume a 45-degree-linearly-polarized light and then passed by the LC layer 13, where the orientation of the LC molecules is turned by about 22.5 degrees. As a result, the light assumes a 0-degree-linearly-polarized light. Thus, the light reflected by the reflection film 16 cannot pass through the first polarizing film 11 whereby the reflection area 21 displays a dark state or black. It should be noted that the retardation of the LC layer 13 upon display of a dark state and the retardation of the retardation film 18 are theoretically λ/2 and λ/4, respectively. However, the reflection area 21 can display a dark state, i.e., black, if the retardation of these layers significantly vary, so long as the reflection area 21 is set to operate as a ½ wavelength film with respect to a light having a wavelength of 550 nm as a whole when the orientation of the LC molecules in the LC layer 13 is turned by about 22.5 degrees in the reflection area 21.

On the other hand, the potential difference between the pixel electrode 36 and the second common electrode 38 is 0V in the transmission area 22 in the state where the drive signal shown in FIG. 3B is applied, whereby the LC molecules in the LC layer 13 are not turned. In other words, the LC molecules maintain the initial orientation of 90 degrees. Under this condition, as shown in FIG. 4B, the 0-degree-linearly-polarized light (having a transverse polarization) after passing through the second polarizing film 15 has a polarization direction parallel to the slow axis of the retardation film 18. Thus, the 0-degree-linearly-polarized light enters the LC layer 13 as a transversally-polarized light without showing any change and passes through the LC layer 13 without a change of the polarized state before being incident onto the first polarizing film 11. Therefore, the light incident onto the first polarizing film 11 from the LC layer 13 cannot pass through the first polarizing film 11 and hence the transmission area 22 displays a dark state, i.e., displays black.

As described above, the LCD device 10 of the present embodiment can change the orientation direction of the LC molecules in the LC layer 13 only in the reflection area 21 by inverting the drive signal to be applied to the first common electrode 37 and the drive signal to be applied to the second common electrode 38, while supplying a common pixel signal to the pixel electrodes 35 and 36. As a result, the transmission area 22 displays a dark state when the reflection area 21 displays a dark state. In other words, the reflection area 21 and the transmission area 22 can display black simultaneously without supplying separate pixel signals to the two areas.

Figure 5A:
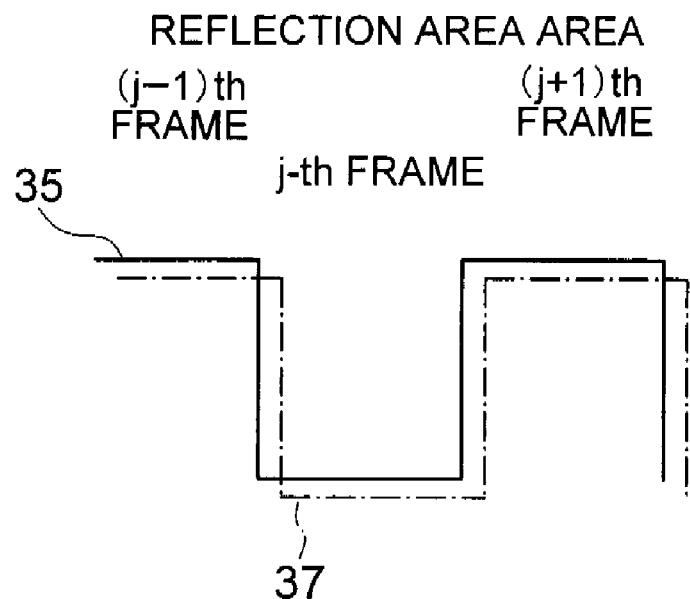
FIGS. 5A and 5B are a timing chart illustrating another example of the waveform of the drive signal applied in the reflection area and transmission area, respectively.
Figure 5B:
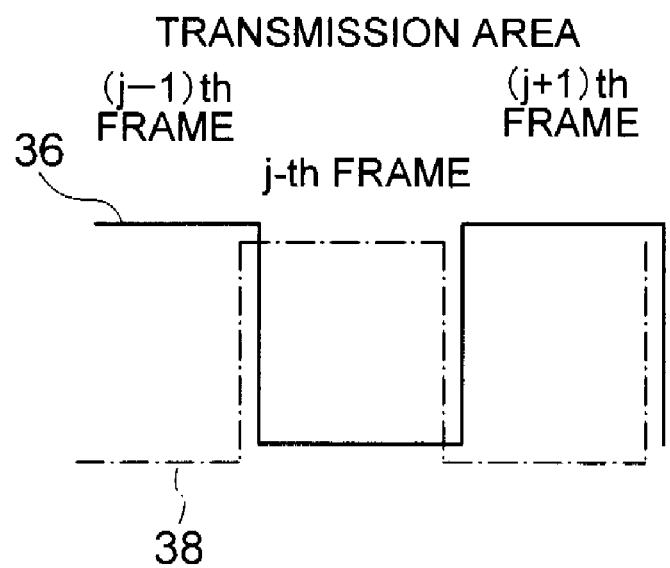

Now, operation of displaying a bright state or white in the LCD device 10 of the embodiment will be described below, FIGS. 5A and 5B are a timing chart illustrating the waveform of a drive signal in the reflection area 21 and in the transmission area 22, respectively, at a stage of operation different from the stage shown in FIGS. 3A and 3B. FIGS. 6A and 6B are a graph illustrating the polarization of the light observed in the reflection area 21 and in the transmission area 22, respectively, when the drive signals shown in FIGS. 5A and 5B are applied.

Under the condition where the drive signal shown in FIG. 5A is applied, no electric field is generated between the pixel electrode 35 and the first common electrode 37 in the reflection area 21, whereby the orientation direction of the LC molecules in the LC layer 13 remains at 0 degree in the reflection area 21. Therefore, the longitudinally-linearly-polarized light that passes through the first polarizing film 11 passes through the LC layer 13 and the retardation film 18, remaining as the longitudinally-linearly-polarized light, before it is reflected by the reflection film 16 in the reflection area 21, as shown in FIG. 6A. The light reflected by the reflection film 16 again passes through the retardation film 18 and LC layer 13 without changing the polarization state thereof and enters the first polarizing film 11. Thus, the reflection area 21 displays a bright state, i.e., displays white.

On the other hand, under the condition where the drive signal shown in FIG. 5B is applied, the LC molecules in the LC layer 13 are driven to rotate by about 45 degrees by the electric field generated between the pixel electrode 36 and the second common electrode 38 in the transmission area 22. Therefore, the transversally-linearly-polarized light that is transmitted through the second polarizing film 15 passes through the LC layer 13 to assume a longitudinally-linearly-polarized light and passes through the first polarizing film 11 in the transmission area 22, as shown in FIG. 6B. In this way, the transmission area 22 displays white when the reflection area 21 displays white. This is obtained by inverting the drive signal to be applied to the first common electrode 37 and the drive signal to be applied to the second common electrode 38. In short, the two areas can display white at the same time by applying the drive signals shown in FIGS. 5A and 5B.

The pixel electrode 35 for the reflection area 21 and pixel electrode 36 for the transmission area 22 are connected to the TFTs 33 and 34, respectively, which are separately provided, and the TFTs 33 and 34 are connected to the same gate line 31 and the same data line 32. As a result, the common pixel signal is written to the pixel electrode 35 for the reflection area 21 and pixel electrode 36 for the transmission area 22 by way of the same data line 32. In the above configuration, the TFT 33 and pixel electrode 35 are provided for the reflection area 21, and the TFT 34 and pixel electrode 36 are provided for the transmission area 22, although the common pixel signal is written to both the electrodes 35 and 36. This is because the voltage changes differently at the pixel electrode 35 for the reflection area 21 and at the pixel electrode 36 for the transmission area 22 after writing the pixel potential and turning off the TFTs. This reason will be described below more specifically.

Figure 7A:
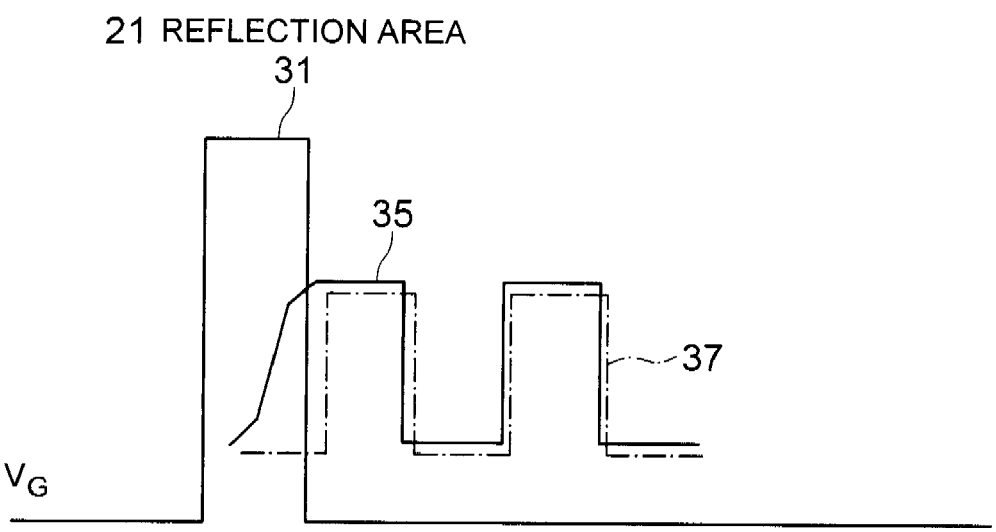
FIGS. 7A and 7B are a timing chart illustrating an example of the potential change of the pixel electrode after a drive signal is applied thereto in the reflection area and transmission area, respectively.
Figure 7B:
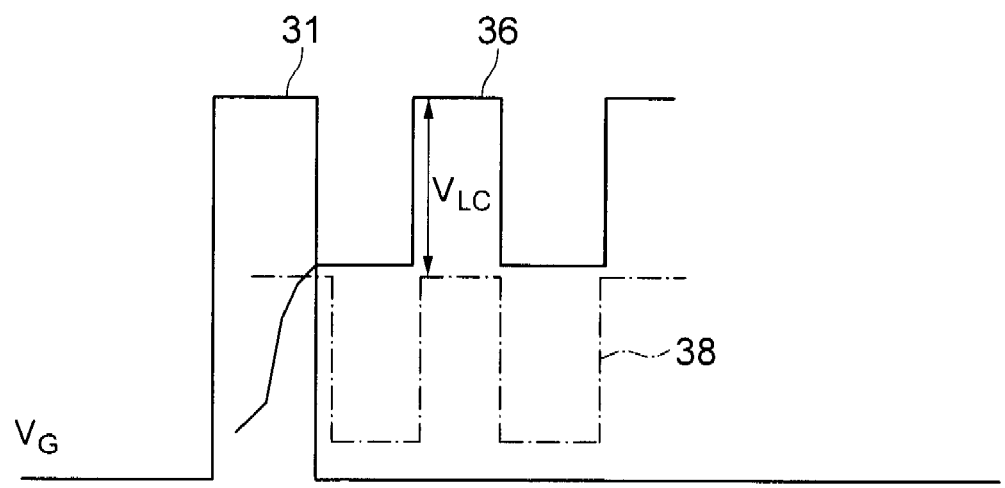

FIGS. 7A and 7B are an illustration of the potential change observed at the pixel electrodes 35 and 36, respectively, after the pixel electrodes 35 and 36 are supplied with pixel signals of the i-th frame shown in FIGS. 3A and 3B. When, for example, the gate-line-inversion drive scheme is adopted, the inversion of each of the electric potentials of the common electrodes 37 and 38 is repeated according to the polarity inversion of each row from the time when a gate signal pulse is applied to the gate line 31 to the time when a gate signal pulse is applied to the gate line 31 for the next frame in order to invert the drive polarity on the row-by-row basis. At this stage, since the TFTs 33 and 34 are OFF, the pixel electrodes 35 and 36 are isolated from the data line 32 and held in a floating state, whereby the electric potential thereof fluctuates according to the potential change of the first common electrode 37 and the second common electrode 38, while maintaining the potential difference observed at the time when the pixel signal as shown in FIGS. 7A and 7B is written. This is due to the coupling capacitance between the pixel electrode 35 and the first common electrode 37 and between the pixel electrode 36 and the second common electrode 38. Since the pixel electrode 35 in the reflection area 21 and pixel electrode 36 in the transmission area 22 exhibit different potential changes after the supply of the pixel signal as described above, the TFT 33 and the pixel electrode 35 for the reflection area 21 need be provided separately from the TFT 34 and the pixel electrode 36, respectively, for the transmission area 22.

In the present embodiment, the common electrode is separated into the first common electrode 37 and the second common electrode 38 corresponding to the reflection area 21 and the transmission area 22, respectively. Common-electrode signals are supplied to the first common electrode 37 and the second common electrode 38 so that the magnitude of the common-electrode signals with respect to the pixel signal, which is common to the reflection area 21 and transmission area 22, is reversed between the reflection area 21 and the transmission area 22. With this arrangement, similar images can be displayed in the reflection area 21 and in the transmission area 22 without supplying different pixel signals to the reflection area 21 and the transmission area 22. Thus, the problem of inversion of the luminance between the reflection area 21 and the transmission area 22 in an IPS-mode transflective LCD device is solved by the present embodiment.

The orientation direction of the LC layer 13 in the transmission area 22 upon display of a dark state and the polarization direction of the light incident onto the LC layer 13 are parallel or perpendicular to each other in the present embodiment. With this arrangement, the influence by the wavelength dispersion of the retardation film 18 and the LC layer 13 can be reduced in the transmission area 22 upon display of a dark state compared to the case of the LCD device of the related art where the slow axis of the retardation film and orientation direction of the LC molecules are neither parallel nor perpendicular to each other. Additionally, the relationship between the orientation direction of the LC layer 13 and the polarization direction of the first polarizing film 11 as well as the second polarizing film 15 in the translation region 22 is similar to that in an ordinary IPS-mode transmissive LCD device. Therefore, the contrast ratio in the transmission area 22 of the LCD device of the present embodiment is equivalent to that of the ordinary IPS-mode transmissive LCD device.

The orientation direction of the LC layer 13 upon display of a dark state and the slow axis of the retardation film 18 are arranged perpendicularly to each other, and thus, in the transmission area 22, the angle between the polarization direction of the light incident onto the retardation film 18 from the second polarizing film 15 and the slow axis of the retardation film 18 is set at 0 degree or 90 degrees in the present embodiment. With this arrangement, the linearly-polarized light exiting from the second polarizing film 15 is incident onto the LC layer 13 without changing the polarization state in the retardation film 18. Therefore, the influence by the retardation of the retardation film 18 is eliminated to suppress the leakage light in the transmission area 22 occurring in the front viewing direction as well as occurring in an oblique viewing direction upon display of a dark state, thereby improving the contrast ratio.

In a typical TN-mode LCD device, the reflection film is configured by a pixel electrode, and a pixel signal for driving the LC layer based on the gray-scale level of the image is supplied to the pixel electrode acting as the reflection film. This means the electric potential of the reflection film cannot be determined arbitrarily. On the other hand, in a typical IPS-mode LCD device, the electric potential applied to the reflection film 16 can be determined arbitrarily because the LC layer 13 is driven by the lateral electric field applied between the pixel electrode 35 and the first common electrode 37. Now, the influence by the electric potential of the reflection film 16 on the display of image in the reflection area 21 will be discussed below.

Figure 8A:
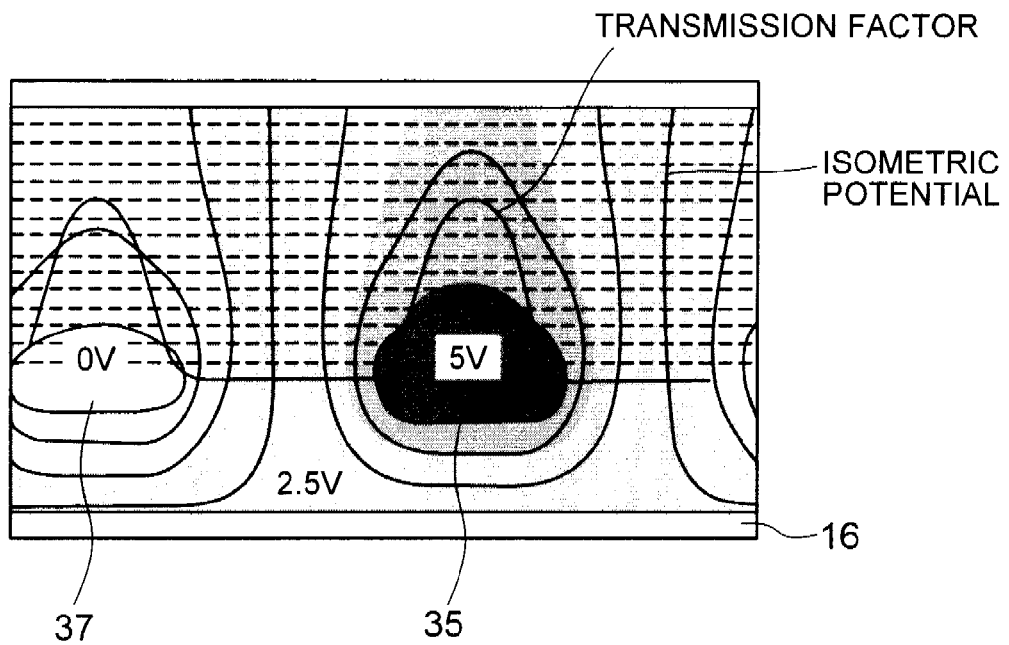
FIGS. 8A and 8B are a graph illustrating the result of simulation showing the electric field distributions and the optical transmission during display of dark state, respectively.
Figure 8B:
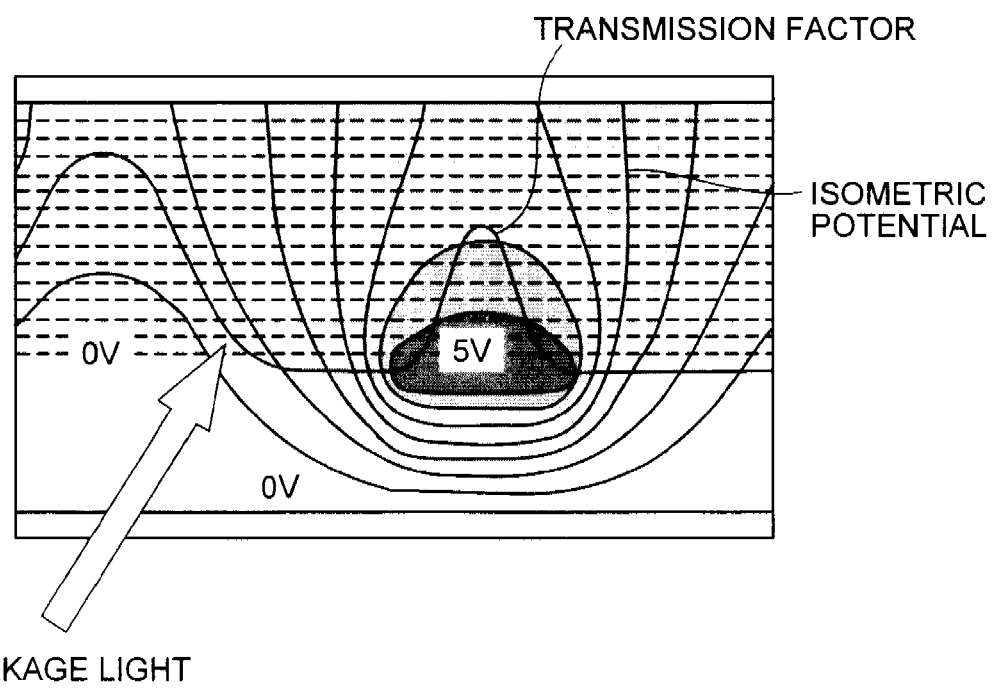

FIGS. 8A and 8B are a graph illustrating an electric field distribution and optical transmission factor both obtained by simulation for the case of a normally-black-mode LCD device. FIG. 8A shows the electric field distribution and the optical transmission factor when 5V and 0V are applied to the pixel electrode 35 and common electrode 37, respectively, and the electric potential of the reflection film 16 is at a median between the two voltages, i.e., 2.5V. FIG. 8B shows the electric field distribution and the optical transmission factor when 5V and 0V are applied to the pixel electrode 35 and the common electrode 37, respectively, and the electric potential of the reflection film 16 is the same as that of the common electrode, i.e., 0V.

When the electric potential of the reflection film 16 is at a median between the electric potential of the pixel electrode 35 and that of the common electrode 37, leakage light occurs on the pixel electrode 35 and common electrode 37 to exhibit a higher optical transmission factor, whereas the leakage light is suppressed to a lower level in the gap between the two electrodes to exhibit a lower transmission factor, as will be understood from FIG. 8A. To the contrary, when the electric potential of the reflection film 16 is at the level same as that of the common electrode 37, the leakage light is remarkable at and near the common electrode 37 to exhibit a higher optical transmission factor. This is probably due to the fact that the electric field between the pixel electrode 35 and the reflection film 16 is strong and the lines of electric force that should converge between the pixel electrode 35 and the common electrode 37 are directed toward the reflection film 16, and consequently, the LC molecules located in the vicinity of the common electrode 37 are not driven to a sufficient level.

From the results of the above described simulation, it is desirable that the electric potential of the reflection film 16 stay at a median between that of the pixel electrode 35 and that of the common electrode 37. The electric potential of the reflection film 16 can be controlled directly by applying a desired electric potential to the reflection film 16 or indirectly using a capacitive coupling while maintaining the reflection film 16 in a floating state thereof. When the floating state is employed for the reflection film 16, the electric potential of the reflection film 16 can be maintained at the median potential between the electric potential of the pixel electrode 35 and that of the common electrode 37, by the configuration wherein a conductor applied with the electric potential of the pixel electrode 35 and a conductor applied with the electric potential of the common electrode 37 are provided right below the reflection film 16, both the conductors having an area ratio of 1:1. The conductor may be an interconnection or a conductor film.

Figure 9:
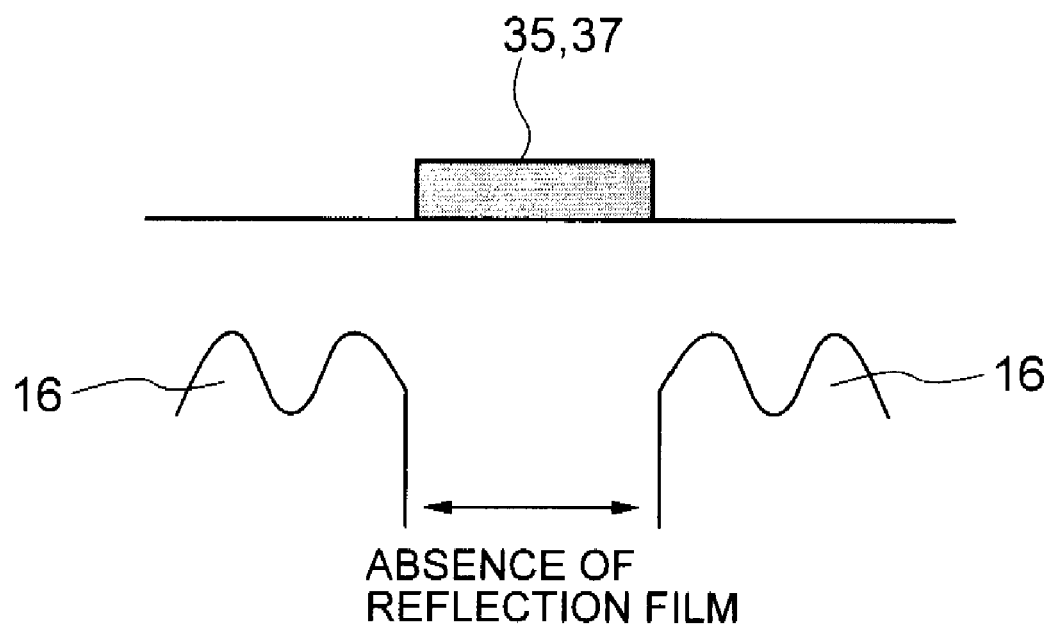
FIG. 9 is an enlarged sectional view of a portion of a pixel in the vicinity of reflection film right under the pixel electrode or common electrode.

Now, the leakage light is discussed. Since the leakage light occurs on the pixel electrode 35 and common electrode 37, the luminance upon display of a dark state cannot be reduced sufficiently as will be understood from FIG. 8A. For suppressing the influence by the leakage light, it is sufficient to exclude the reflection film 16 from the area right below the pixel electrode 35 and the common electrode 37 by patterning the reflection film 16, as shown FIG. 9 for example. With this arrangement, the luminance of the reflected light observed at the position where the pixel electrode 35 and the common electrode 37 are formed can be reduced, so as to reduce the luminance upon display of a dark state.

A process for manufacturing the TFTs, interconnections, pixels and common electrodes on the TFT substrate 14 (FIG. 1) will be described below with reference to FIGS. 10 to 17, which show consecutive steps of the process for fabrication of the pixel on the TFT substrate as well as the drawings attached thereto. Each of FIGS. 10 to 17 is attached with one or a plurality of drawings showing sectional views taken in the each figure. The sectional views are specified by a corresponding drawing number and a suffix attached thereto, the suffix including A, B, C, D and E corresponding to the line A-A', B-B', C-C', D-D' and E-E', respectively, taken in the corresponding figure to show the sectional views.

Figure 10:
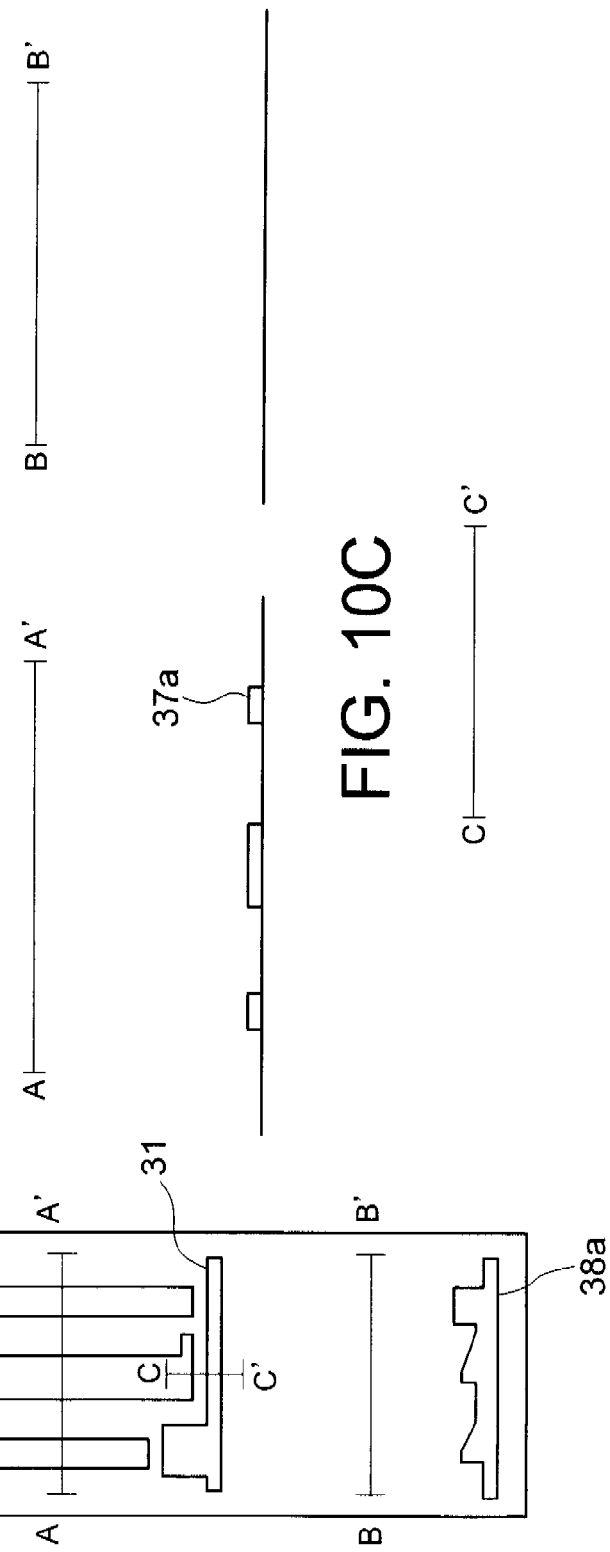

In the process, gate line 31 (FIG. 2), first common-electrode line 37a and second common-electrode line 38a are formed on a transparent substrate by means of the pattern shown in FIG. 10. FIGS. 10A to 10C show the reflection area 21, transmission area 22 and vicinity of the boundary between the reflection area 21 and the transmission area 22, respectively, and are taken on lines A-A', B-B', and C-C' in FIG. 10. The first common-electrode line 37a is disposed to project into the display area in order to apply an electric potential to the reflection film 16 in the reflection area 21. Thereafter, the gate line 31, first common-electrode line 37a and second common-electrode line 38a are covered by an insulating layer.

Figure 11:
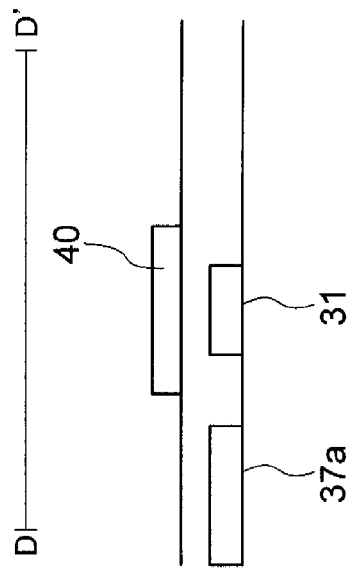
Figure 11D:
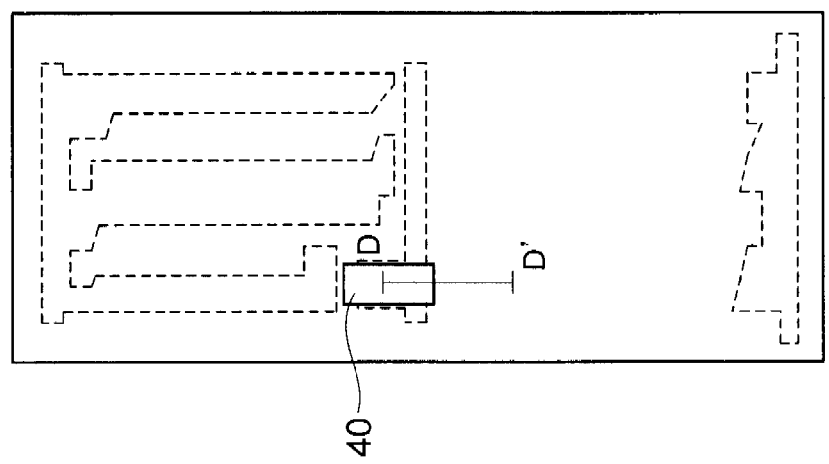

Subsequently, a semiconductor layer 40 is formed to configure the TFT 33, as shown in FIG. 11. More specifically, the semiconductor layer 40 formed in this step overlaps the gate line 31 (or gate electrode), as shown in FIG. 11D, or a sectional view taken along line D-D' in FIG. 11.

Thereafter, a pixel-electrode line 35a to be connected to the source/drain of the TFT 33 and another pixel-electrode line 36a to be connected to the source/drain of another TFT 34 are formed using the pattern shown in FIG. 12. FIGS. 12A to 12C show the reflection area 21, transmission area 22 and vicinity of the boundary between the reflection area 21 and the transmission area 22 at this stage. A first common-electrode line 37a is formed between two adjacent pixel-electrode lines 35a in the reflection area 21. The first common-electrode line 37a is so formed that the area of the pixel-electrode line 35a and that of the first common-electrode line 37a have a ratio of 1:1 in the display area. This is intended to apply, upon display of an image on the product LCD device, an electric potential equal to a median between the electric potential of the pixel electrode 35 and that of the first common electrode 37 to the reflection film 16, which is to be formed later. After forming the first common-electrode line 37a and second common-electrode line 38a, these electrode lines 37a and 38a are covered by an insulating layer.

Subsequently, on OC layer (overcoat layer) 40 is formed by means of the pattern shown in FIG. 13. More specifically, the OC layer 40 is formed to configure a concave-and-convex surface in the reflection area 21, although it is formed flat in the transmission area 22. An Al layer is formed on the OC layer 40 in the reflection area 21, and patterned to configure the reflection film 16 by means of the pattern shown in FIG. 14. FIGS. 14A to 14C show the reflection area 21, transmission area 22 and vicinity of the boundary between the reflection area 21 and the transmission area 22 at this stage. As shown in FIG. 14A, the Al layer is removed from the region right below the pixel electrode 35 and the first common electrode 37, which are to be formed in a later step.

After forming the reflection film, the retardation film 18 is formed by means of the pattern shown in FIG. 15. More specifically, the step of forming the retardation film 18 includes the steps of forming a polyimide matching layer on the OC layer 40, baking the polyimide matching layer and treating the baked polyimide matching layer for orientation. A rubbing technique or a photo-induced orientation technique is generally employed for the orientation treatment. Then, the material for a retardation film (LC polymer) is coated to a thickness that can produce a desired level of the retardation, the thickness providing a λ/4 wavelength film for a light having a wavelength of 550 nm in the present embodiment.

Since the material of the retardation film is aligned in the orientation direction under this condition, ultraviolet rays are irradiated onto the material at this stage, at room temperature in an $N_2$ ambient for polymerization. As a result of formation of the retardation film 18, the concave-and-convex surface of the reflection area 21 is smoothed, as shown in FIGS. 15A to 15C, and the cell gap is adjusted so as to have a constant value both in the reflection area 21 and in the transmission area 22. Thereafter, contact holes 42 are formed in the insulating layer covering the pixel-electrode lines 35a, 36a, first common-electrode line 37a and second common-electrode line 38a at the position indicated in FIG. 16, to expose the pixel-electrode lines 35a, 36a, first common-electrode line 37a and second common-electrode line 38a, as shown in FIG. 16E.

After forming the contact holes, pixel electrodes 35, 36, first common electrode 37 and second common electrode 38 are formed on the retardation film 18 by means of the pattern shown in FIG. 17. FIGS. 17A to 17C show the reflection area 21, transmission area 22 and vicinity of the boundary between the reflection area 21 and the transmission area 22 at this stage. During forming the pixel electrodes 35, 36, first common electrode 37 and second common electrode 38, the process allows the electrodes including the pixel-electrode lines 35a, 36a, first common-electrode line 37a and second common-electrode line 38a to be connected to each other by way of the contact holes 42. The TFT substrate 14 to be used for the transflective LCD device 10 of the present embodiment is thus manufactured using the above-described manufacturing process.

Figure 18:
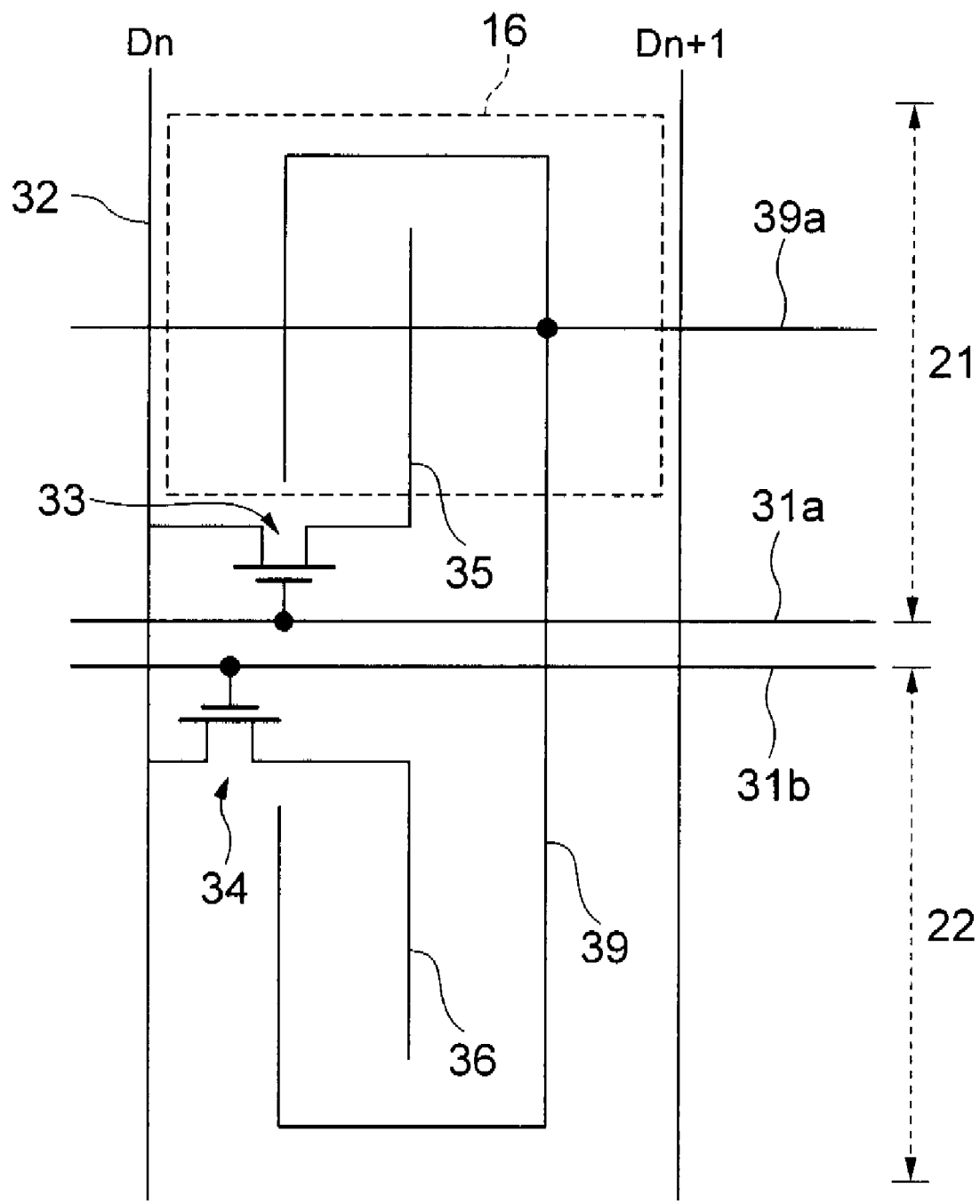
FIG. 18 is a schematic illustration of the electric connection in the pixel of a transflective LCD device according to a second embodiment of the present invention.

Now, a second exemplary embodiment of the present invention will be described below. FIG. 18 is a top plan view illustrating the structure for a single pixel including the TFTs, variety of lines, pixel electrodes, and common electrodes formed on the TFT substrate 14. The LCD device 10a of the present embodiment has a sectional structure similar to that of the LCD device 10 of the first embodiment shown in FIG. 1, and includes first polarizing film, counter substrate, LC layer, TFT substrate and second polarizing film. The polarization direction of the first polarizing film, that of the second polarizing film, direction of the slow axis of the retardation film and orientation direction of LC molecules in the LCD device 10*a* of the present embodiment are similar to those of the LCD device 10 of the first embodiment. The LCD device 10*a* of the present embodiment has a configuration similar to that of the LCD device 10 of the first embodiment except the structure of each pixel in the top plan view, and the way of application of the drive signals being applied to the gate line 31 and data line 32. Therefore, the detailed description of the constituent elements in the present embodiment will be omitted herein whereas designating similar constituent elements by reference numerals similar to those used in FIG. 1.

Referring to FIG. 18, the gate lines 31*a*, 31*b* and data line 32 that extend perpendicular to each other are formed on the transparent substrate, and TFTs 33, 34 are formed in the vicinity of intersections between the gate lines 31*a*, 31*b* and the data line 32. In this embodiment, different gate lines are provided for the reflection area 21 and the transmission area 22. In other words, the gate line 31*a* is connected to the gate of the TFT 33 that corresponds to the reflection area 21, whereas the gate line 31*b* is connected to the gate of the TFT 34 that corresponds to the transmission area 22. One of the source/drain of the TFT 33 is connected to the data line 32 whereas the other is connected to the reflection-area pixel electrode 35 in the reflection area 21. The common electrode 39 formed in both of the reflection area 21 and the transmission area 22 is connected to the same common-electrode line (COM line) 39*a*, and a common-electrode signal having a specific waveform that is common to all the pixels of the LCD device 10*a* is supplied to the common electrode 39 in the two areas by way of the COM line 39*a*.

Figure 19A:
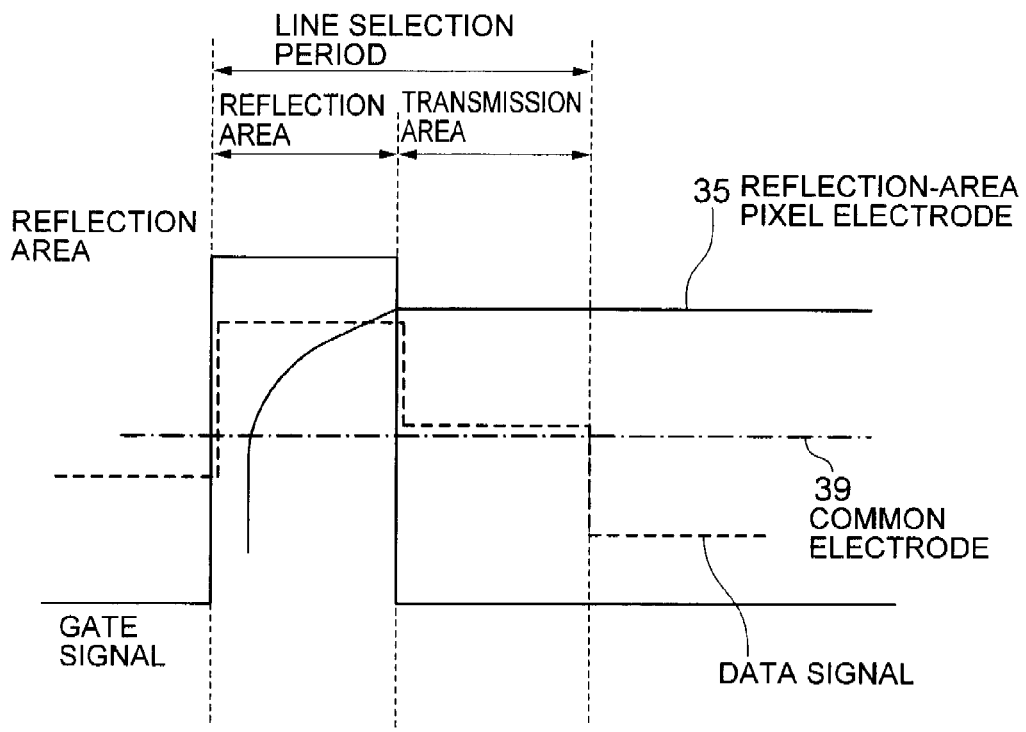
FIGS. 19A and 19B are a timing chart illustrating the waveform of a drive signal in the reflection area and a transmission area, respectively.
Figure 19B:
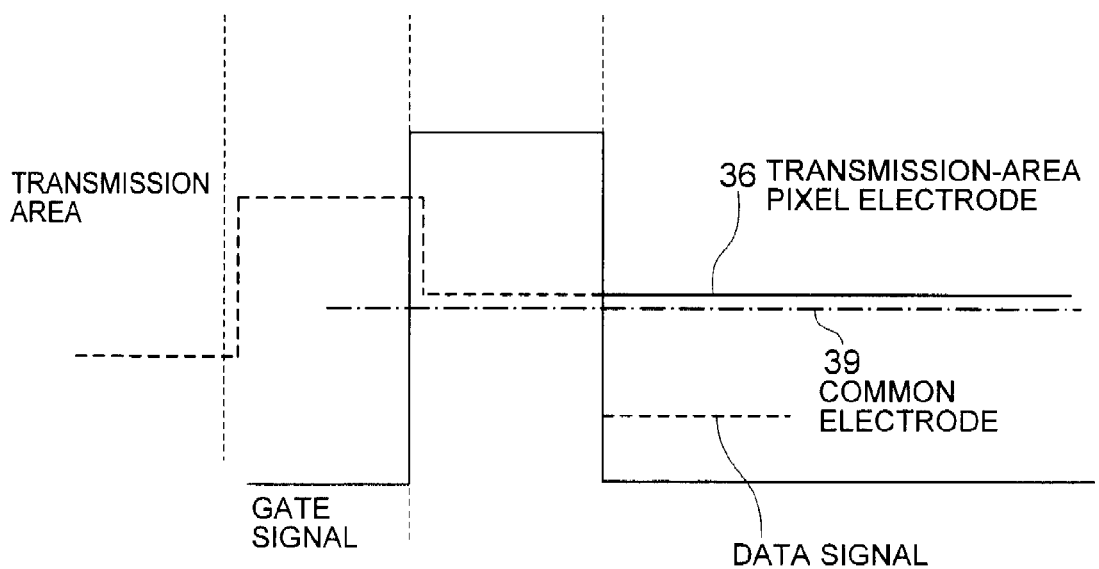

FIGS. 19A and 19B are a timing chart showing the electric potential of the data lines, gate line, reflection-area pixel electrode, transmission-area pixel electrode and common electrode during the time period when a pixel potential is written to the data line or pixel electrode, and the way of the potential change thereafter. FIG. 19A shows the way of the change in the electric potential in the reflection area 21, whereas FIG. 19B shows the way of change in the electric potential in the transmission area 22. Since a dot-inversion drive scheme is employed in the present embodiment, the electric potential of the common electrode 39 (FIG. 18) does not change and is fixed to 0V. Since two gate lines including a reflection-area gate line 31*a* and a transmission-area gate line 31*b* are provided in the present embodiment, the line selection period is divided into a reflection-area selection period and a transmission-area selection period for the gate lines. The reflection-area gate signal is held ON in the reflection-area selection period and the transmission-area gate signal is held ON in the transmission-area selection period for driving the pixel.

A data signal that corresponds to the gray-scale level to be displayed in the reflection area 21 and a data signal that corresponds to the gray-scale level to be displayed in the transmission area 22 are supplied in the reflection-area selection period and transmission-area selection period, respectively. For example, an electric-potential data signal of V(63) =5V is supplied to the data line 32 in the reflection-area selection period and an electric-potential data signal of V(0) =0V is supplied to the data lie 32 in the transmission-area selection period. Thus, 5V is written to the reflection-area pixel electrode 35 whereas 0V is written to the transmission-area pixel electrode 36 depending on the selection period. Since the electric potential of the common electrode is 0V, an electric field corresponding to 5V is applied to the reflection area and the LC layer displays a dark state because the reflection area is normally white. On the other hand, an electric field corresponding to 0V is applied to the transmission area and thus the LC layer displays a dark state because the transmission area is normally black. In this way, both the reflection area and transmission area display a dark state due to the change of the drive signal supplied to the data line 32 from the reflection-area selection period to the transmission-area selection period and vice versa.

Figure 20:
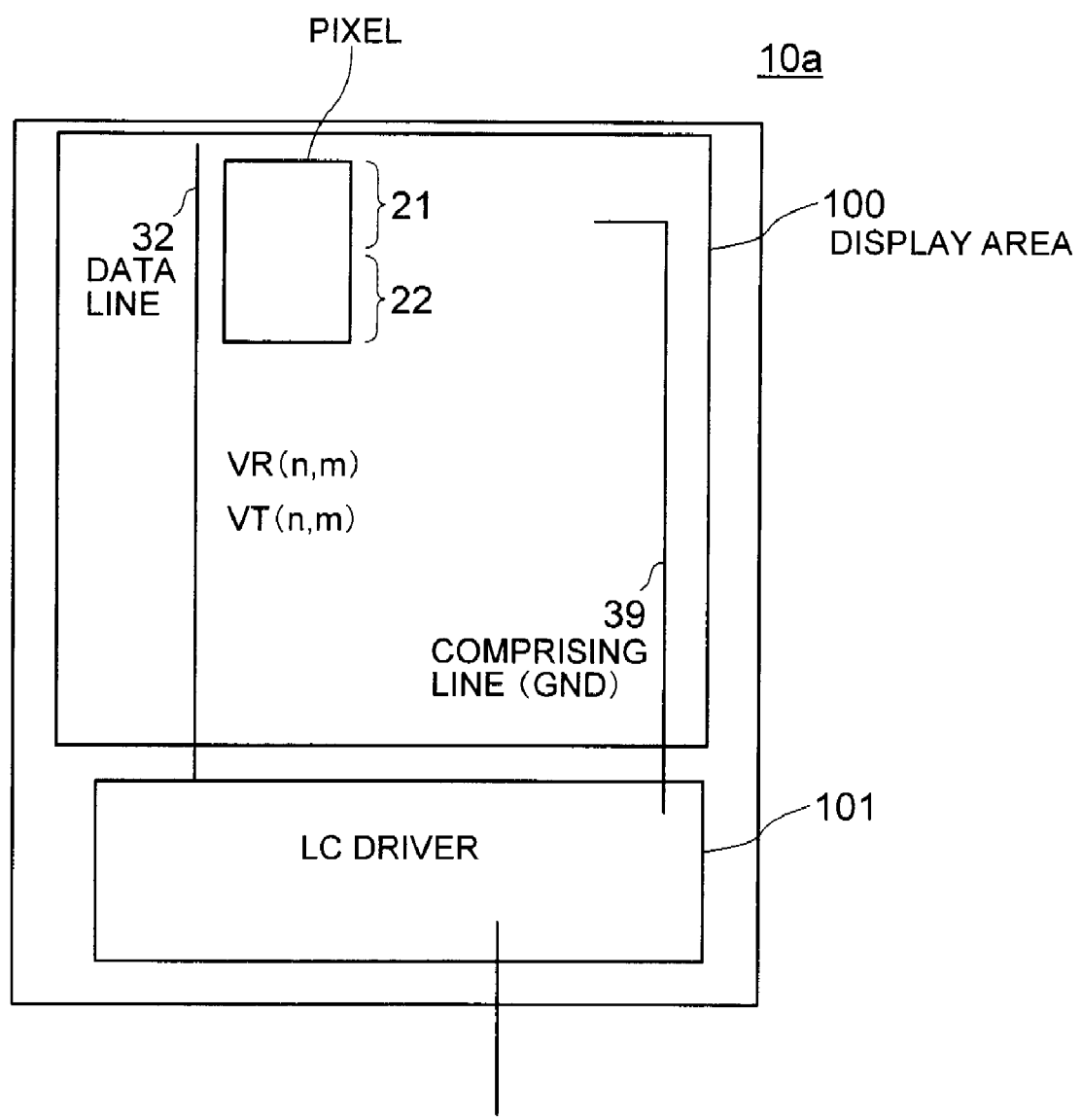
FIG. 20 is a schematic block diagram of the LCD device of the second embodiment, including illustration of the LC driver.

Now, the technique of generating a data signal (reflection potential) that corresponds to the reflection area 21 in the reflection-area selection period and a data signal (transmission potential) that corresponds to the transmission area 22 in the transmission-area selection period will be described below. FIG. 20 is a schematic block diagram of the LCD device 10*a* including the LC driver, according to the second embodiment of the present invention. The LC driver 101 for driving the LC display area 100 typically supplies each of the pixels thereof with a timing signal for the LC layer and a digital signal (D (n, m)) of around RGB 8 bits for the pixel on a serial basis. The LC driver 101 then generates the gate signals to be supplied to the gate lines 31*a*, 31*b*, data signal to be supplied to the data line 32, and common-electrode signal to be supplied to the common electrode 39.

Figure 21:
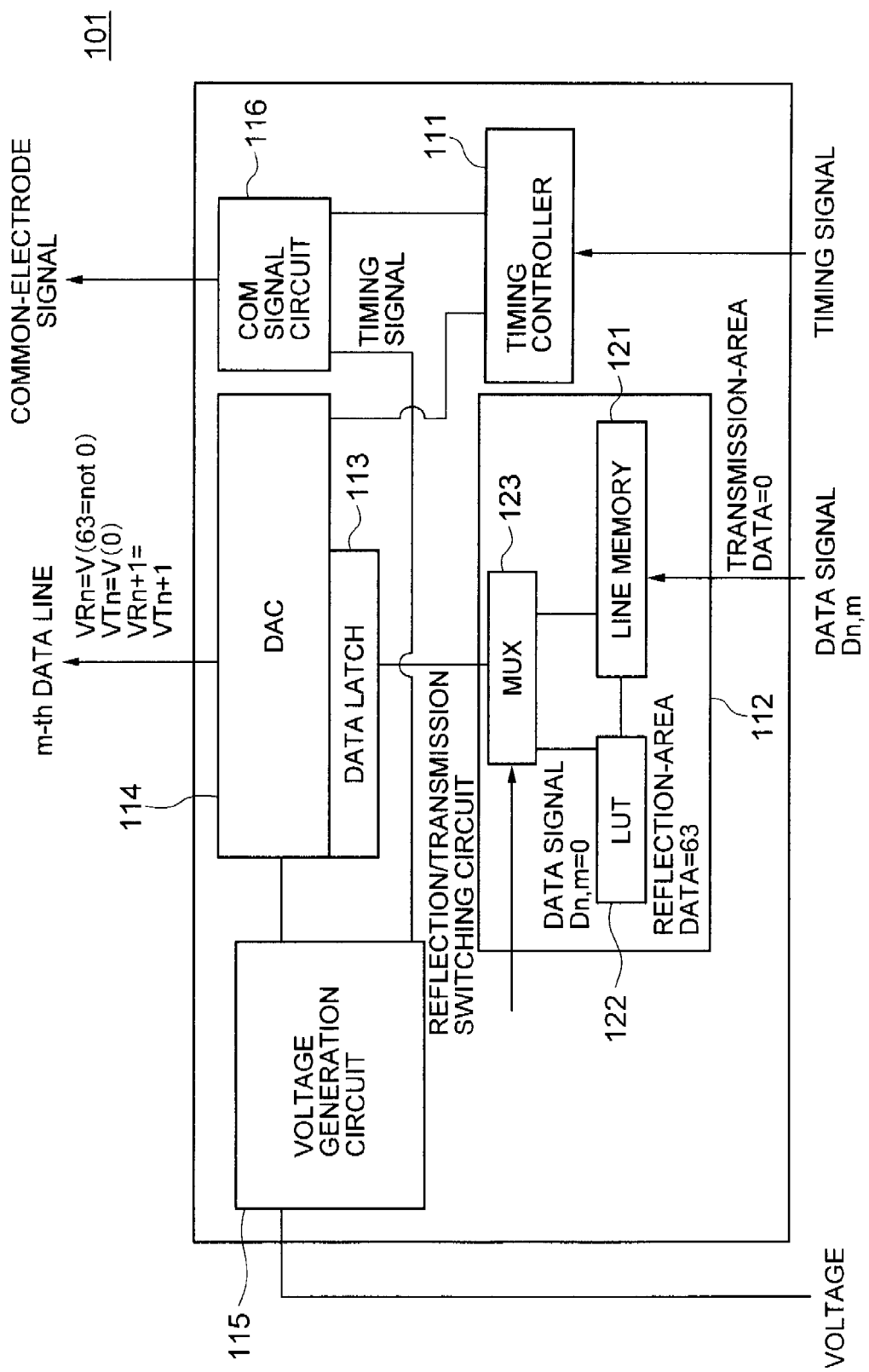
FIG. 21 is a schematic block diagram of an example of the LC driver shown in FIG. 20.

FIG. 21 is a schematic block diagram of the LC driver 101, showing the configuration thereof. The LC driver 101 includes a timing controller 111, a reflection/transmission switching circuit 112, a data latch circuit 113, a digital/analog conversion circuit (DAC) 114, a voltage generation circuit 115 and a COM signal circuit 116. The timing controller 111 includes a gate-timing generation circuit and a data-timing generation circuit, and generates a variety of timing signals based on the timing signal input thereto. More specifically, the LC driver 101 splits the timing for a single row of pixels to produce a timing for the reflection area (reflection-area selection period) and a timing for the transmission area (transmission-area selection period), and drives the gate lines 31*a*, 31*b* based on these timings. However, the gate signals including the gate signal to be supplied to the gate line 31*a* that corresponds to the reflection area 21 and the gate signal to be supplied to the gate line 31*b* that corresponds to the transmission area 22 may be generated in the LC driver 101 or by means of the TFTs configuring a shift register on the TFT substrate.

The reflection/transmission switching circuit 112 receives a digital pixel signal D(n, m) and a reflection/transmission selection signal as the input thereof. The reflection/transmission switching circuit 112 outputs a digital reflection-area pixel signal that corresponds to the reflection area 21 in the reflection-area selection period, and outputs a digital transmission-area pixel signal that corresponds to the transmission area 22 in the transmission-area selection period for each pixel. The data latch circuit 113 performs a serial/parallel conversion and delivers the digital pixel signal output from the reflection/transmission switching circuit 112 to the DAC circuit 114. The DAC circuit 114 generates a voltage signal (data signal) that corresponds to the gray-scale level of the digital pixel signal input thereto from the data latch circuit 113 and the voltage generated by the voltage generation circuit 115. The COM signal circuit 116 generates the common-electrode signal to be supplied to the common electrode 39 (FIG. 18) of each pixel.

The reflection/transmission switching circuit 112 includes therein a line memory 121 for storing a part of the input digital pixel signal D(n, m) that corresponds to a line of pixels, a LUT (lookup table) circuit 122 that performs an operation of gray-scale level conversion for the reflection area based on a LUT for the gray-scale-level conversion section and a selection circuit (MUX: multiplexer) 123 for selecting the digital pixel signal for the transmission area and the digital pixel signal for the reflection area. The digital pixel signal D(n, m) input to the LC driver 101 is temporarily stored in the line memory 121. The LUT circuit 122 generates a digital reflection-area pixel signal by inverting the gray-scale level of the digital pixel signal stored in the line memory 121. The MUX circuit 123 selects the digital reflection-area pixel signal that is generated by the LUT circuit 122 so as to correspond to the reflection area 21 in the reflection-area selection period and transmits the same to the data latch circuit 113 and the DAC circuit 114. The MUX circuit 123 selects the digital pixel signal that is not allowed to pass through the LUT circuit 122 (digital transmission-area pixel signal) in the transmission-area selection period and transmits the same to the data latch circuit 113 and the DAC circuit 114.

When, for example, a digital pixel signal of D(n, m)=0 is input to the LC driver 101 for the pixel on the n-th row and the m-th column, the LUT circuit 122 outputs a digital pixel signal produced by inverting the digital data of the pixel signal. At this stage, the LUT circuit 122 may invert the digital data of the pixel signal, and also perform γ-conversion in a conversion-LUT for each gray-scale level, thereby matching the γ-characteristic in the reflection area with the γ-characteristic in the transmission area. FIG. 33 is a lookup table (TABLE-1) showing an example of the conversion-LUT, wherein the gray-scale level is abbreviated as GSL.

For example, when a digital pixel signal of D(n, m)=0 is input to the LC driver 101 for the pixel on the n-th row and the m-th column, the reflection/transmission switching circuit 112 outputs "63 (5 bits)" obtained by inverting the gray-scale level "0" with reference to the LUT of Table 1 for the reflection-area selection period. Then, the DAC circuit 114 outputs the data signal of Vtpix(n)=V(63)=0V to the data line 32 as a data signal corresponding to the reflection area 21. On the other hand, the reflection/transmission switching circuit 112 outputs gray-scale level "0" directly for the transmission-area selection period. Then, the DAC circuit 114 outputs the digital signal of Vtpix(n)=V(0)=5V to the data line 32 as a data signal corresponding to the transmission area 22.

Figure 22:
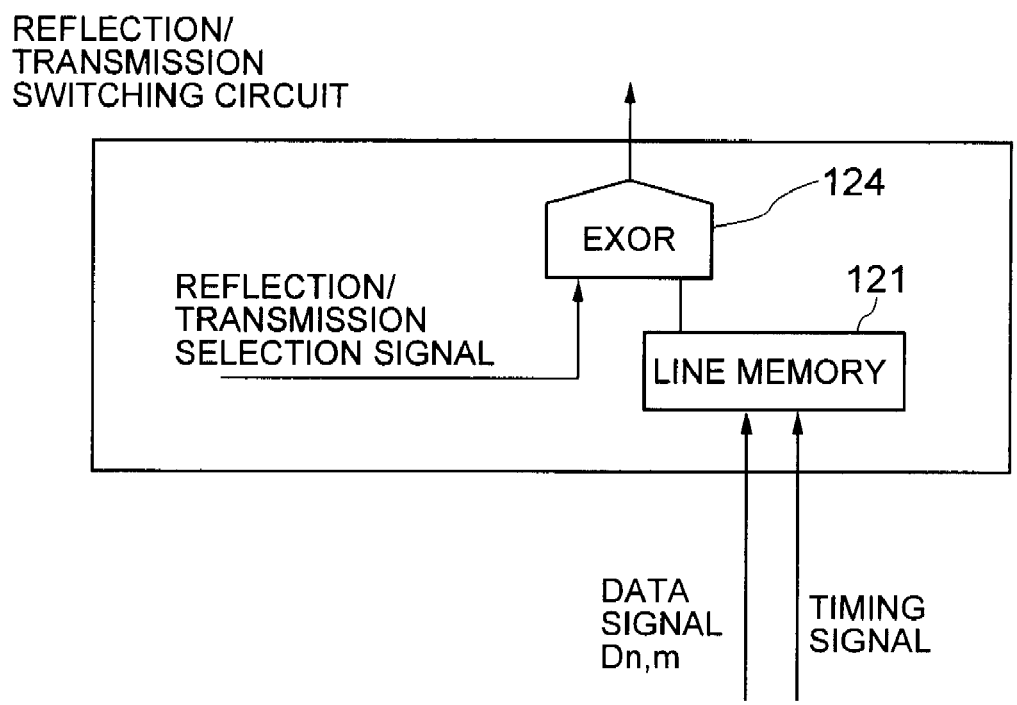
FIG. 22 is a schematic block diagram of another example of the reflection/transmission switching circuit shown in FIG. 21.

As a result of the above described operation, a specific data signal that shows different electric potentials for the reflection-area selection period and the transmission-area selection period can be prepared from an ordinary digital pixel signal. Whereas the reflection/transmission switching circuit 112 generates a digital reflection-area pixel signal with reference to the lookup table (LUT) for the gray-scale-level conversion section for the reflection area in the above example, the present invention is by no means limited thereto. FIG. 22 is a schematic block diagram of the reflection/transmission switching circuit 112, showing another possible configuration thereof. For instance, an arrangement of connecting the output of the line memory 121 and the reflection/transmission selection signal to an exclusive-OR circuit 124 may be employed as shown in FIG. 22 when generating a digital reflection-area pixel signal by inverting a unit digital data. The circuit scale of the reflection/transmission switching circuit can be reduced with this arrangement.

In summary, in the present embodiment, the gate line is divided into a gate line 31a that corresponds to the reflection area 21 and a gate line 31b that corresponds to the transmission area 22. Additionally, a pixel write period is divided into two periods, and a data signal that corresponds to the reflection area 21 and a data signal that corresponds to the transmission area 22 are supplied from a common data line 32 to drive the respective regions. In this configuration, the data signal that corresponds to one of the areas is generated based on the gray-scale-level signal input to the LC driver 101, whereas the data signal that corresponds to the other area is generated based on the gray-scale-level signal obtained by inverting the input gray-scale-level signal in the pixel-gray-scale level conversion circuit. With this arrangement, data signals having different voltages can be written to the respective pixel electrodes 35, 36 of the areas and the voltage applied to the two areas can be different from each other, by differentiating the potential difference between the common electrode 39 and the pixel electrode 35 in the reflection area 21 from the potential difference between the common electrode 39 and the pixel electrode 36 in the transmission area 22, to allow both the areas to display the same color.

Figure 23:
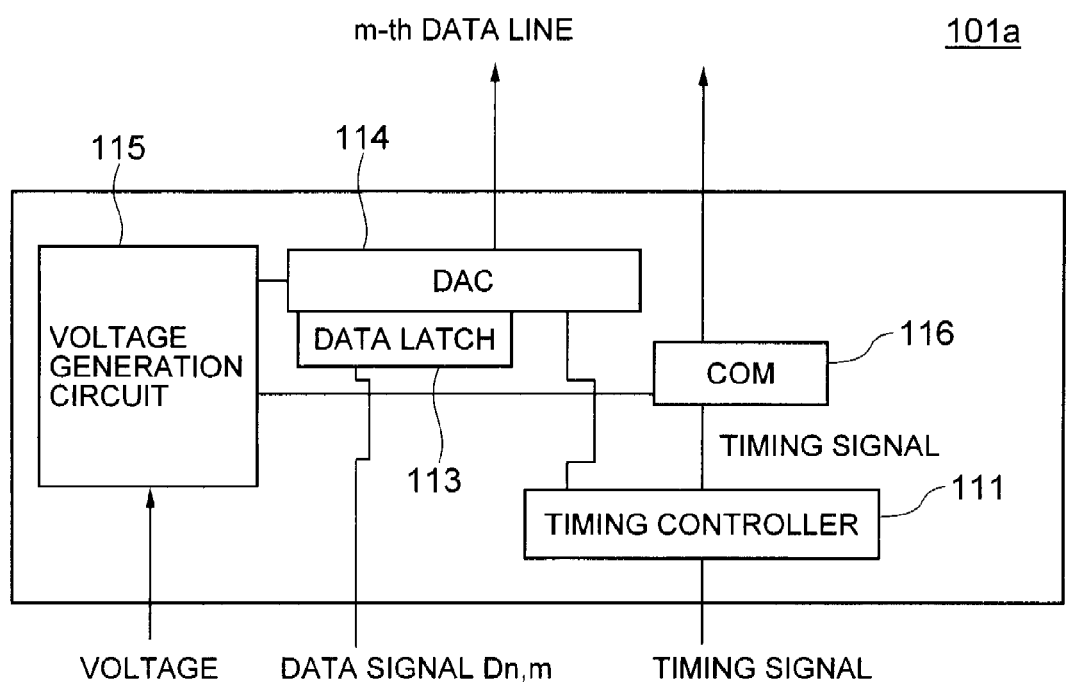
FIG. 23 is a schematic block diagram of the LC driver in a LCD device according to a third embodiment of the present invention.

Now, a LCD device according to a third embodiment of the present invention will be described below. The planar structure of the TFT substrate in each pixel of the transflective LCD device of the third embodiment is similar to that of the TFT substrate in each pixel of the second embodiment. FIG. 23 is a schematic block diagram of the LC driver employed in the LCD device of the third embodiment. The LC driver 101a of the present embodiment is realized by removing the reflection/transmission switching circuit 112 from the LC driver 101 of the second embodiment shown in FIG. 21. The COM signal circuit 116 supplies different electric potentials to the common electrode in the reflection-area selection period and in the transmission-area selection period of the selection period for a single line of the pixels in the present embodiment.

Figure 24A:
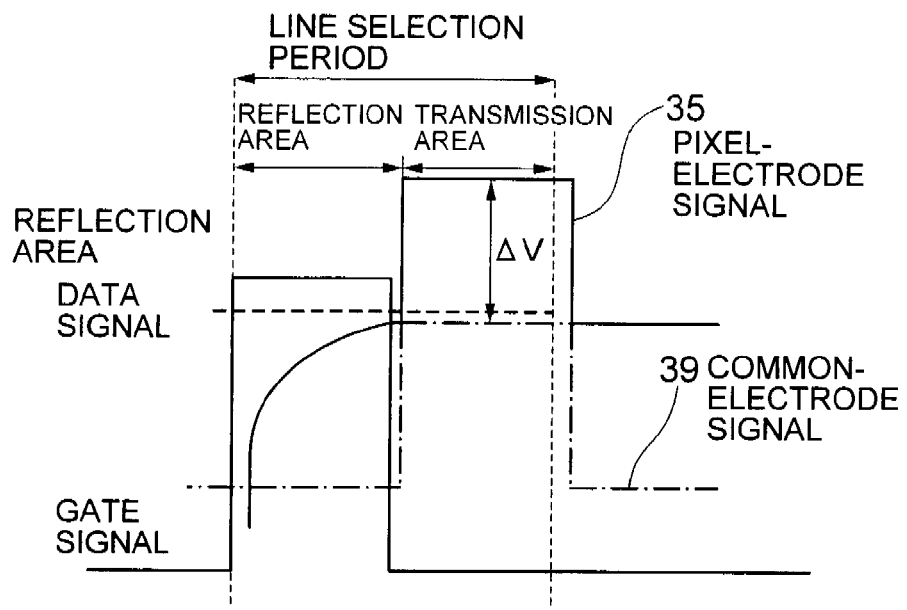
FIGS. 24A and 24B are a timing chart illustrating the signal drive waveform in the reflection area and transmission area, respectively.
Figure 24B:
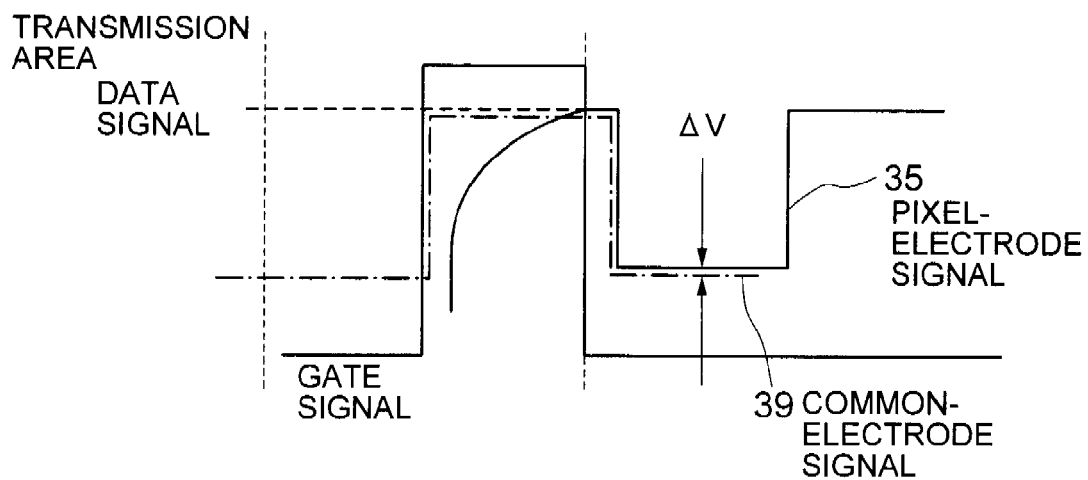
Figure 25:
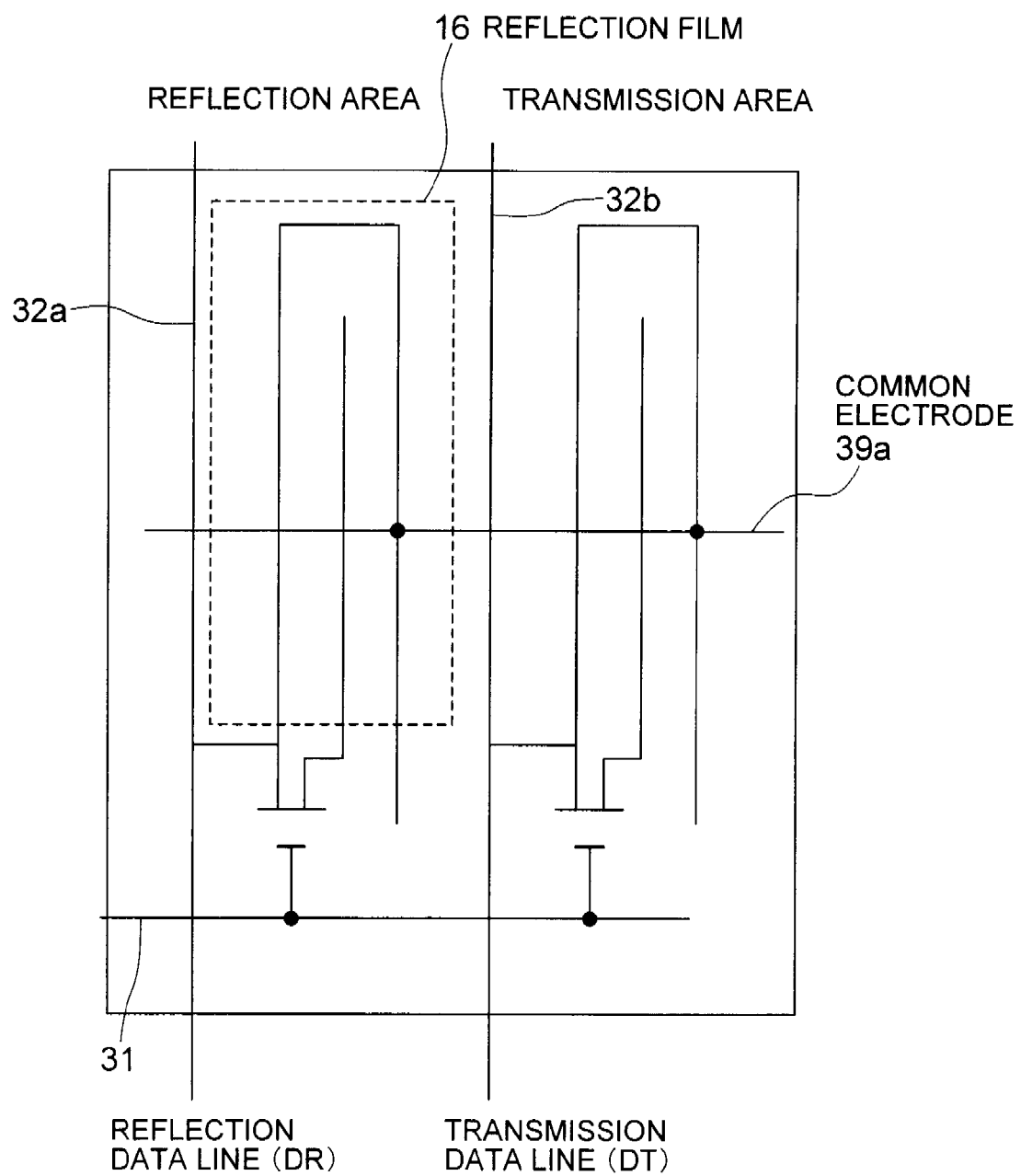
FIG. 25 is a schematic top plan view of a modification of the pixel in the LCD device of the second or third embodiment.

FIGS. 24A and 24B show a timing chart of the electric potential of the data lines, gate line, reflection-area pixel electrode, transmission-area pixel electrode and common electrode during the time interval when a pixel potential is written to the data line or the pixel electrode and thereafter. This embodiment adopts a gate-line-inversion drive scheme. In the present embodiment, as in the second embodiment, the gate line is split into a reflection-area gate line 31a (FIG. 18) connected to the TFT of the reflection area and a transmission-area gate line 31b connected to the TFT of the transmission area, and the gate line selection period is also split into a reflection-area selection period and a transmission-area selection period accordingly. The reflection-area gate signal is held ON in the reflection-area selection period and the transmission-area gate signal is held ON in the transmission-area selection period for driving the pixels.

The data signal is synchronized with the line selection period and assumes, for instance, an electric potential of V(63)=5V in both the reflection-area selection period and the transmission-area selection period. The common-electrode signal changes at half the each line selection period. In other words, the common-electrode signal changes at each reflection-area selection period and at each transmission-area selection period. For example, if the data signal is 0V at the reflection-area selection period, the data signal assumes 5V at the transmission-area selection period. Thus, the 5V applied to the reflection area allows the refection area to operate in a normally white mode, and the LCD device displays a dark state. On the other hand, since 0V is applied to the transmission area to allow the transmission area to operate in a normally black mode, and the LCD displays a dark state. In this way, the LCD displays a dark state, or black, in both the reflection area and the transmission area.

In the present embodiment, the pixel write period is split into two periods and the same data signal is written to the pixel electrodes 35, 36 in both of the write periods, whereas the electric potential applied to the common electrode 39 is inverted between the write period to the reflection area 21 and the write period to the transmission area 22. With this arrangement, the potential difference between the common electrode 39 and the pixel electrodes 35, 36 is differentiated between the reflection area 21 and the transmission area 22 to differentiate the voltages applied to the two areas, thereby allowing the two areas to display the same gray-scale level.

In the above description, the gate line is divided into the reflection-area gate line 31a and the transmission-area gate line 31b and different electric potentials are applied to the reflection-area pixel electrode and the transmission pixel electrode, both in the above described second and third embodiments. However, the data line 32 may be split into a reflection-area data line 32a and a transmission-area data line 32b, and different electric potentials may be applied to the reflection-area pixel electrode and the transmission-area pixel electrode as an alternative arrangement. With this arrangement, a common gate line or separate gate lines may be used for controlling the reflection-area TFT and the transmission-area TFT. Both the reflection area and the transmission area may be allowed to display the same gray-scale level when the arrangement of splitting the data line 32 into the two data lines is adopted.

Figure 26:
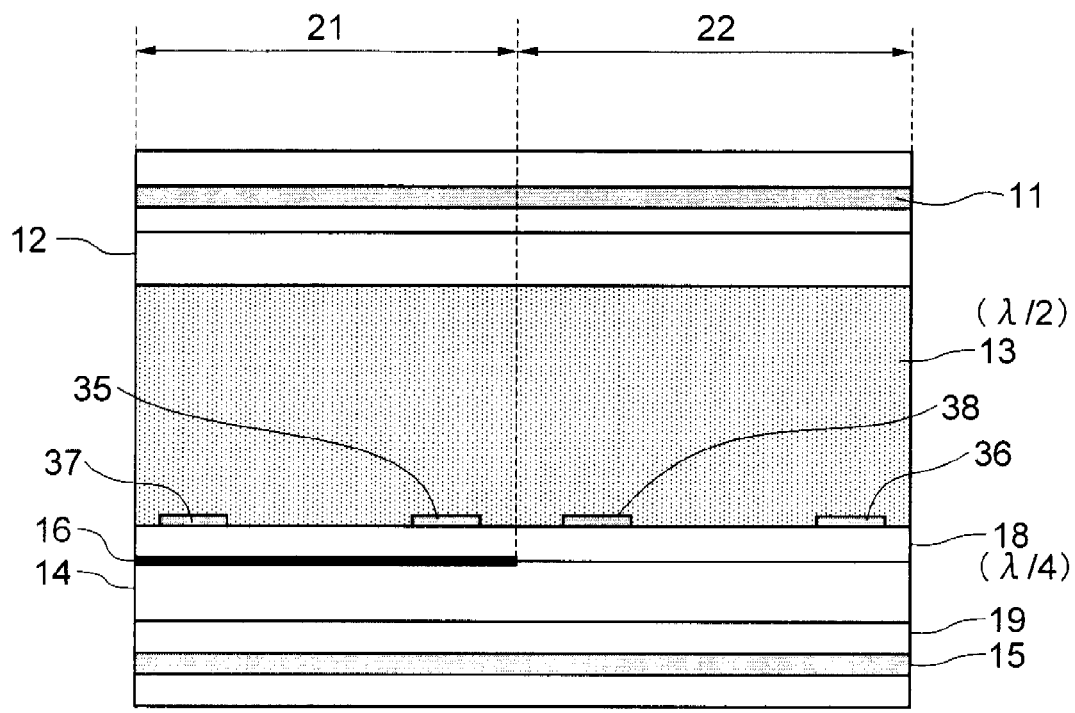
FIG. 26 is a schematic sectional view of a pixel in a LCD device according to a fourth embodiment of the present invention.

Now, a LCD device according to a fourth embodiment of the present invention will be described below. FIG. 26 is a schematic sectional view of the transflective LCD device according to a fourth embodiment of the present invention. In the present embodiment, a polarizing-film protection layer provided for the second polarizing film 15 on the surface thereof near the LC layer 13 is utilized as a retardation film 19. The retardation film 19 has an optical isotropy and is arranged to receive the incident linearly-polarized light to have a polarization perpendicular to the slow axis of the retardation film 18. In other configurations, the present embodiment is similar to the first through third embodiments.

Generally, TAC (triacetyl cellulose) is used for the protection layer for protecting a polarizing film. TAC has an optical characteristic of a negative mono-axis optical anisotropy in a direction perpendicular to the surface thereof. If a TAC film is used for protecting the polarizing layer of the second polarizing film 15 and formed on a surface of the polarizing layer near the LC layer 13, retardation is generated by the polarizing-film protection layer in an oblique viewing direction. This results in that the light incident onto the retardation film 18 is changed from the linearly-polarized light to an elliptically-polarized-light and the polarization thereof is changed consecutively by the retardation film 18 and LC layer 13 to raise the level of leakage light and degrade the viewing angle characteristic in an oblique viewing direction, particularly upon display of a dark state.

The polarizing-film protection layer (or retardation film) 19 for protecting the second polarizing film 15 and provided on the surface of the polarizing layer near the LC layer 13, as described above, may be replaced by an optical isotropic layer to allow the incident linearly-polarized light to be perpendicular to the slow axis of the retardation film 18 in the present embodiment. This allows the retardation film 18 to receive the incident light as a linearly-polarized light, whereby the light transmitted through the second polarizing film 15 is transmitted through the retardation film 18 and the LC layer 13 as the linearly-polarized light. With this arrangement, the change in the polarization of light in the retardation film 18 is prevented to suppress the leakage light in an oblique viewing direction upon display of a dark state.

Figure 27:
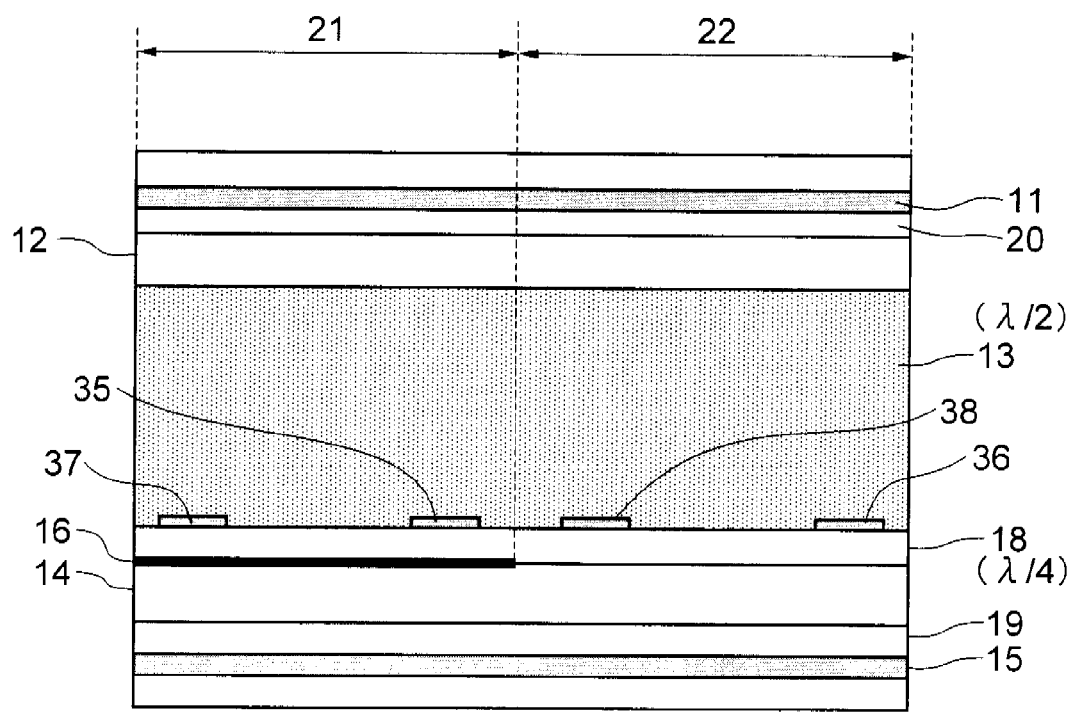
FIG. 27 is a schematic sectional view of a pixel in a LCD device according to a fifth embodiment of the present invention.

Now, a LCD device according to a fifth embodiment of the present invention will be described below. FIG. 27 is a schematic sectional view of a transflective LCD device according to a fifth embodiment of the present invention. The polarizing-film protection layer for protecting the polarizing layer of the second polarizing film 15 and disposed near the LC layer 13 in the fourth embodiment is utilized as the isotropic retardation film 19. In the present embodiment, such a polarizing-film protection layer for protecting the polarizing layer of the first polarizing film 11 and provided near the LC layer 13 is utilized as an optically isotropic retardation film 20, in addition to using the configuration of the fourth embodiment. With this arrangement of utilizing the polarizing-film protection layer for the first polarizing film 11 and disposed near the LC layer 13 as the isotropic retardation film 20 in addition to utilizing the polarizing-film protection layer for the second polarizing film 15 and disposed near the LC layer 13, the influence by the retardation in an oblique viewing direction is prevented to suppress degradation in the viewing angle characteristic, particularly suppress the leakage light in am oblique viewing direction upon display of a dark state, as in the fourth embodiment.

Now, a LCD device according to a sixth embodiment of the present invention will be described below. The transflective LCD device of the sixth embodiment has a configuration similar to that of the fifth embodiment illustrated in FIG. 27. The LCD device of the present embodiment is similar to the fifth embodiment except that the present invention uses a retardation film (+c-plate) having a positive mono-axis optical anisotropy in a direction perpendicular to the surface thereof as the retardation film 19. In the fourth and fifth embodiments, the change of retardation is prevented to suppress the leakage light in an oblique viewing direction upon display of a dark state by using the retardation film 19 having an optical isotropic characteristic. In the present embodiment, the level of leakage light in an oblique viewing direction upon display of a dark state is further suppressed to increase the viewing angle by combining the retardation film 18 and retardation film 19. It is generally known that if a LCD device including the perpendicularly-disposed two polarizing films is observed from an oblique viewing direction, the polarization axis is displaced from the perpendicular position to cause the leakage light. In the present embodiment, the retardation film 19 having a positive mono-axis optical anisotropy in a direction perpendicular to the surface operates as a λ/2 film for compensating the displacement from the perpendicular position, whereby the perpendicularly-disposed polarizing films operate properly regardless of being observed from any viewing angle. Thus, it is only necessary to adjust the retardation of the retardation film 19 so as to allow the combination of the retardation film 18 and the retardation film 19 to operate properly as the λ/2 film which compensates the displacement from the perpendicular position. A similar effect can be achieved by providing a retardation film having a positive mono-axis optical anisotropy in a direction perpendicular to the surface thereof and formed on a TAC layer having a negative mono-axis optical anisotropy in a direction perpendicular to the surface, and adjusting the overall retardation to the retardation as described above.

The LCD devices of the fourth through sixth embodiments were subjected to a simulation to examine the effect of suppressing the level of leakage light in an oblique viewing direction upon display of a dark state. FIG. 28 is a table of combinations of some of the constituent elements and parameters thereof in the LCD devices examined in the simulation. The viewing angle characteristic was observed for an ordinary transmissive IPS-mode LCD device and the first embodiment, where the optical axis of the LC layer 13 and the polarization direction of the incident linearly-polarized light were perpendicular to each other (Example 1-1) and also parallel to each other (Example 1-2), in addition to the observations in Examples 4 through 6 that correspond to the fourth through sixth embodiments, respectively. In the simulation of Example 6, a retardation film including a protection film having an optical isotropy and a retardation film having a positive mono-axis optical anisotropy in a direction perpendicular to the surface thereof, which are layered on another, was used as the retardation film 19.

Figure 29:
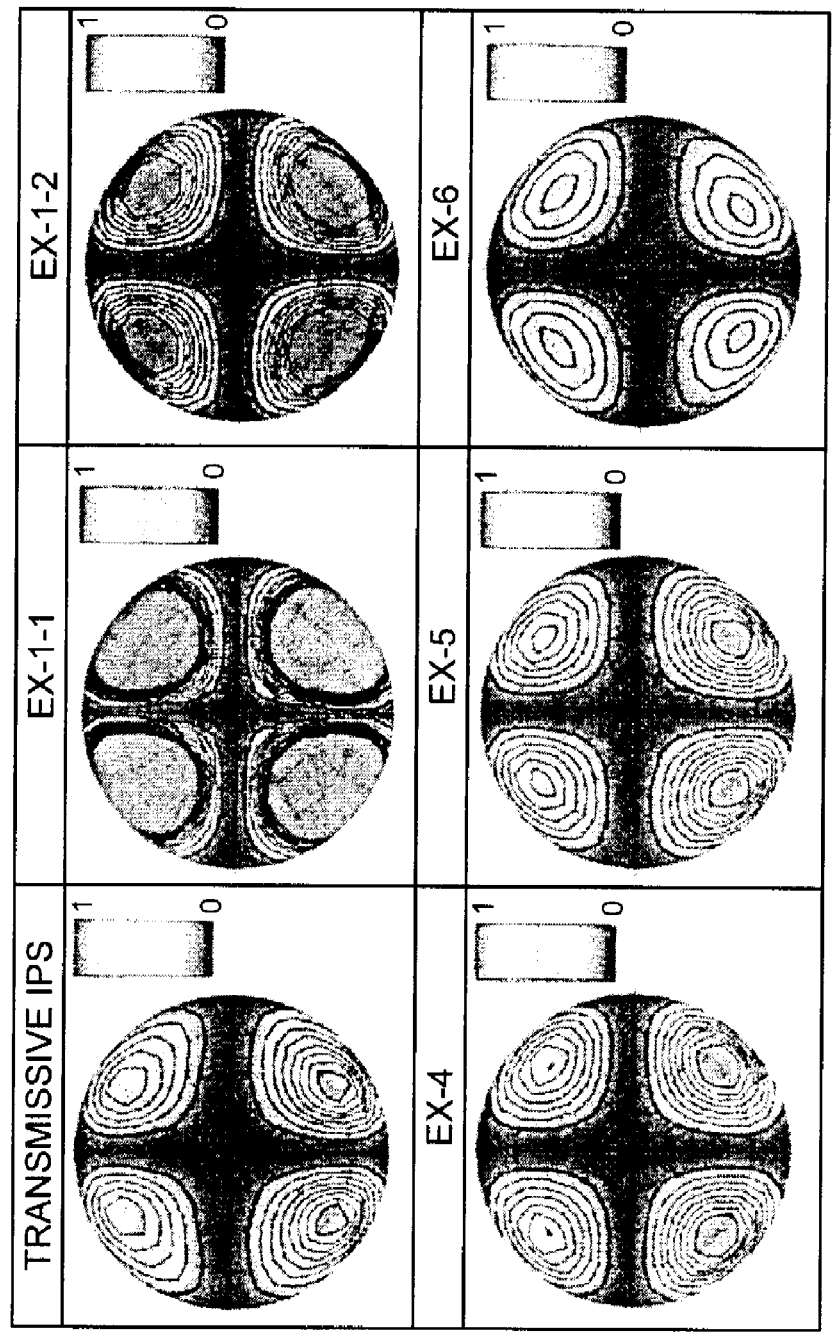
FIG. 29 is an illustration showing isometric luminance distribution obtained by a simulation.

FIG. 29 is an illustration of the results obtained by the simulation. The results shown in FIG. 29 are obtained by determining in calculation the luminance-viewing angle characteristic of each of the combinations in FIG. 28 in the transmission area 22 upon display of a dark state. In FIG. 29, the luminance values obtained when the LCD devices were observed from a variety of azimuth angles upon display of a dark state are indicated by isometric luminance diagrams. By comparing the results of simulation of Example 1-1 and Example 1-2 and those of the ordinary IPS-mode LCD device, it will be understood that the level of leakage light in an oblique viewing direction was raised in Example 1-1 and Example 1-2 to degrade the viewing angle characteristic. This is because the retardation film 18 that operated as λ/4 film was added in the reflection area.

On the other hand, when compared with Example 1-1 and Example 1-2, the level of leakage light in an oblique viewing direction is lowered in Example 4 and Example 5, to thereby provide a viewing angle characteristic equivalent to the ordinary IPS-mode LCD device. The level of leakage light in the oblique viewing direction is further suppressed in Example 6 if compared with the ordinary IPS-mode LCD device. Thus, the fact that the transmission area of the transflective LCD devices of the above embodiments can realize a wide viewing angle was confirmed.

Figure 30:
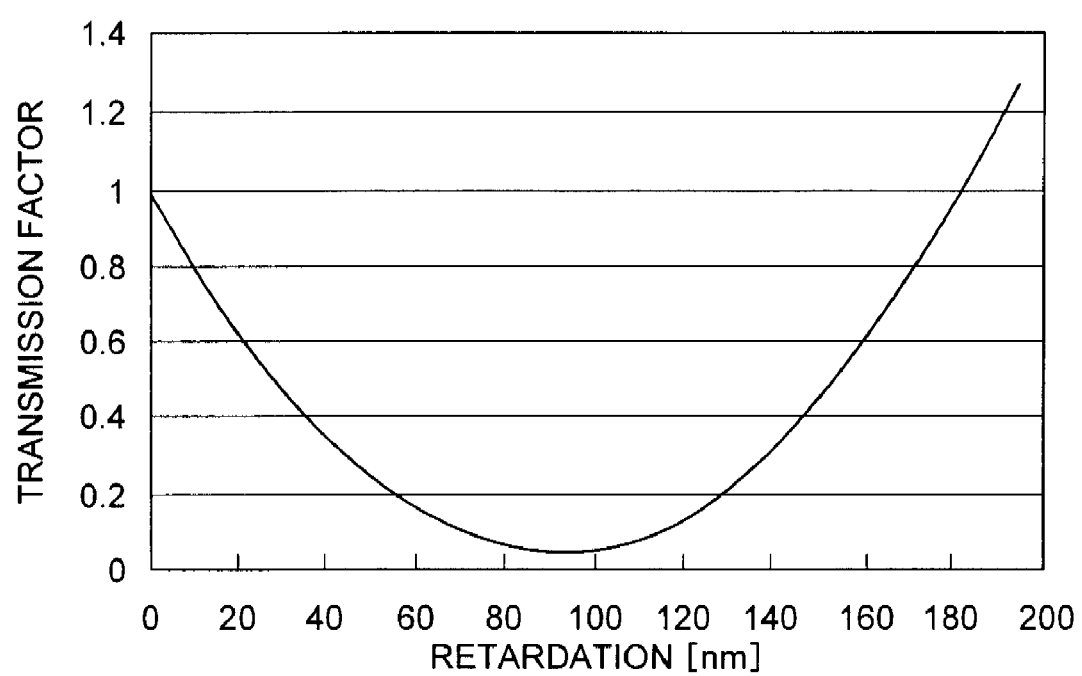
FIG. 30 is a graph illustrating the relationship between the retardation and the transmission factor upon changing the retardation in the thickness direction of the retardation film.

FIG. 30 is a graph illustrating the relationship between the retardation and the transmission factor when the retardation was changed in the thickness direction of the retardation film 19 in Example 6. In FIG. 30, the transmission factor plotted on the ordinate is normalized by the transmission factor at an azimuth angle of 45 degrees and a polar angle of 50 degree in the transmissive IPS-mode LCD device of the related art shown in FIG. 28. The graph of FIG. 30 is obtained by calculating the transmission factor for the azimuth angle of 45 degrees and the polar angle of 50 degrees upon display of a dark state, changing the retardation in the thickness direction of the retardation film 19 within a range between 0 nm and 200 nm. From the graph, it will be understood that the normalized transmission factor is not greater than 1 by confining the retardation of the retardation film 19 to a range between 0 and about 180 in the thickness direction and that an excellent contrast ratio is obtained for the normalized transmission factor of ⅓ when the retardation in the thickness direction is confined to a range between 55 nm and 130 nm.

Figure 31:
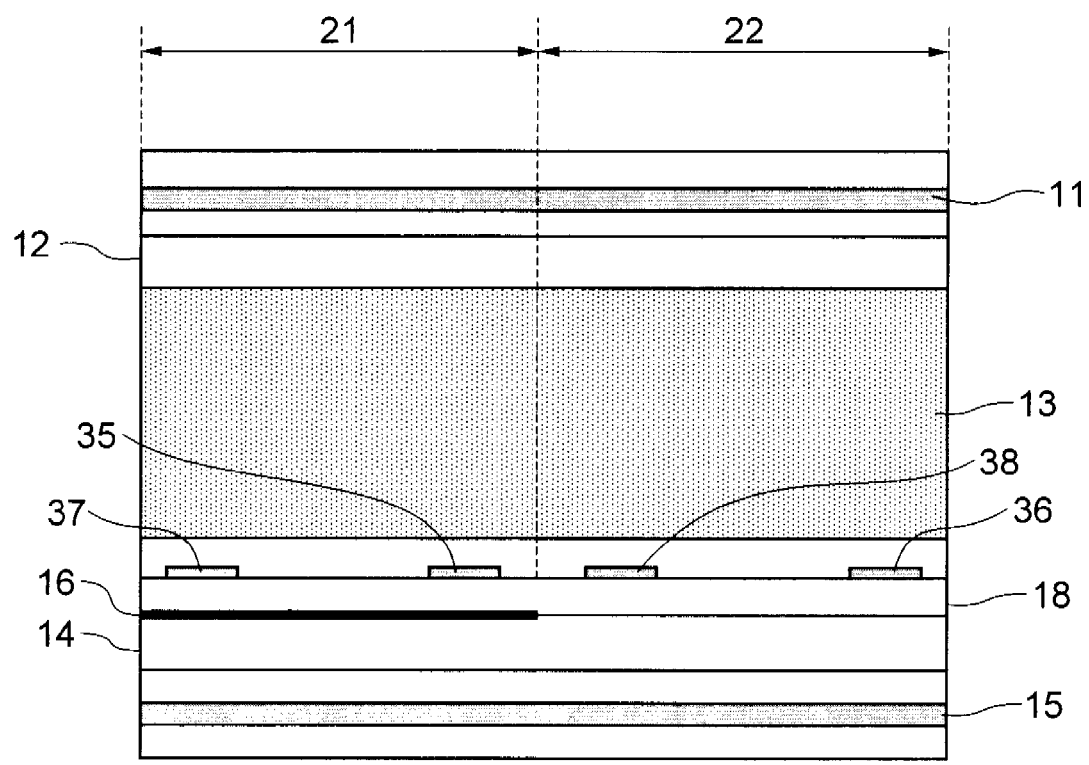
FIG. 31 is a schematic sectional view of a modification of the LCD device of the present invention.
Figure 32:
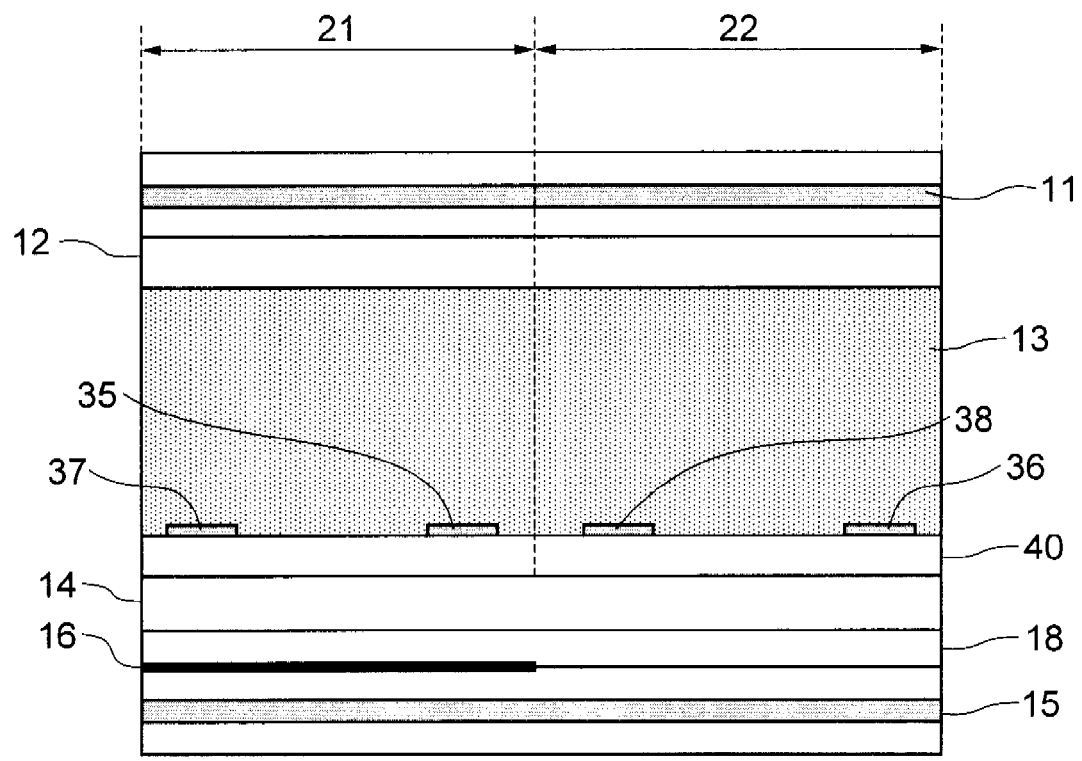
FIG. 32 is a schematic sectional view of another modification of the LCD device of the present invention.

In the configuration of FIG. 1, the pixel electrodes 35, 36 and common electrodes 37, 38 are formed on the retardation film 18, and the retardation film 18 is arranged adjacent to the TFT substrate 14 and LC layer 13. However, the present invention is not limited thereto. It is sufficient for the retardation film 18 to be located above the reflection film 16 (on the side of the counter substrate) and below the LC layer 13 (on the side of the TFT substrate 14) in the reflection area 21. An advantage similar to that of the arrangement of FIG. 1 may be obtained by disposing an optically isotropic layer between the retardation film 18 and the LC layer 13 or the reflection film 16. For example, an alternative arrangement may be employed wherein the insulating layer 40 is arranged between the retardation film 18 and the reflection film 16, and the pixel electrodes 35, 36 and common electrodes 37, 37 are formed on the insulating layer 40, as shown in FIG. 31. Another alternative may be employed wherein the insulating layer 40 is arranged on the TFT substrate 14, and the retardation film 18 and reflection film 16 may be formed on the rear back side of the TFT substrate 14, as shown in FIG. 32.

The transflective LCD device of the above embodiments has the retardation film arranged between the reflection film and the LC layer in the reflection area and between the light-incident-side polarizing film and the LC layer in the transmission area. The slow axis of the retardation film is arranged perpendicular to the orientation direction of the LC molecules upon absence of an applied voltage to the transmission area, and the angle between the polarization direction of a linearly-polarized light incident onto the retardation film from the light incident side and the slow axis of the retardation film is equal to 0 degree or 90 degrees, to thereby suppress the influence by the retardation of the retardation film. With this arrangement, both the leakage light that appears in the front direction when the transmission area operates in a normally black mode and the leakage light that appears in an oblique viewing direction can be prevented to improve the contrast ratio.

In the transflective LCD device of the above embodiments, the retardation film is arranged between the reflection film and the LC layer in the reflection area and between the polarizing film of the light incident side and the LC layer in the transmission area and the slow axis of the retardation film is arranged perpendicular to the orientation direction of the LC molecules upon absence of an applied voltage thereto to allow the angle between the polarization direction of linearly-polarized light incident onto the retardation film from the light incident side and the slow axis of the retardation film to be equal to 0 degree or 90 degrees. With this arrangement, the influence by the retardation of the retardation film that occurs in the transmission area, when the light transmitted through the light-incident-side polarizing film pass through the retardation film, can be suppressed. In addition, both the leakage light in the front direction that appears when the transmission area operates in a normally black mode, and the leakage light that appears in an oblique viewing direction can be prevented to improve the contrast ratio.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A transflective liquid crystal display (LCD) device comprising:
    a liquid crystal (LC) cell comprising a LC layer including therein LC molecules homogeneously oriented and a pair of transparent substrates sandwiching therebetween the LC layer to define an array of pixels, each of said pixels including a transmission area and a reflection area juxtaposed each other;
    first and second polarizing films sandwiching therebetween said LC cell, said first polarizing film being disposed at a front side of said LC cell and having an optical axis perpendicular to an optical axis of said second polarizing film disposed at a rear side of said LC cell;
    a reflection film disposed in said reflection area at a rear side of said LC layer; and
    a retardation film including a first portion disposed in said reflection area between said reflection film and said LC layer, and a second portion disposed in said transmission area between said LC layer and said second polarizing film, said retardation film having a slow axis perpendicular to an initial orientation direction of said LC molecules upon absence of an applied voltage, said slow axis being perpendicular or parallel to said optical axis of said first polarizing film, wherein an orientation of said LC molecules upon display of a dark state has a direction which is different between said reflection area and said transmission area.

2. The transflective LCD device according to claim 1, wherein said first polarizing film extends to cover both said reflection area and said transmission area.

3. The transflective LCD device according to claim 1, wherein said second polarizing film extends to cover both said reflection area and said transmission area.

4. The transflective LCD device according to claim 1, wherein said first portion is in contact with said second portion.

5. The transflective LCD device according to claim 4, wherein said first portion and said second portion are integrally formed and have the same retardation.

6. The transflective LCD device according to claim 1, wherein the orientation of said LC molecules in said transmission area upon display of a dark state has a direction substantially equal to a direction of said initial orientation, and the direction of said LC molecules in said reflection area has a direction substantially deviated from said initial orientation by 20 to 25 degrees.

7. The transflective LCD device according to claim 6, wherein a potential difference applied between a pixel electrode and a common electrode for applying an electric field to said LC layer upon display of a dark state in said transmission area is lower than in said reflection area.

8. The transflective LCD device according to claim 1, wherein a drive voltage of said LC layer in said reflection area is an inversion of a drive voltage of said LC layer in said transmission area, for display of an image in said reflection area and said transmission area.

9. The transflective LCD device according to claim 1, wherein said reflection area and said transmission area operate in a normally white mode and a normally black mode, respectively.

10. The transflective LCD device according to claim 1, said retardation film has a retardation of $\lambda/4$.

11. The transflective LCD device according to claim 1, wherein said LC layer is driven in an in-plane-switching mode.

12. The transflective LCD device according to claim 1, wherein a pixel electrode and a common electrode are disposed on said retardation film.

13. The transflective LCD device according to claim 1, wherein said second polarizing film includes a polarizing layer and a protective layer disposed between said polarizing layer and said LC layer, and said protective layer has an optical isotropy and an optical transmission axis perpendicular to a slow axis of said retardation film.

14. The transflective LCD device according to claim 1, wherein said first polarizing film includes a polarizing layer and a protective layer disposed between said polarizing layer and said LC layer, and said protective layer has an optical isotropy.

15. The transflective LCD device according to claim 1, wherein said first polarizing film includes a first polarizing layer and a first protective layer disposed between said first polarizing layer and said LC layer, said first protective layer has an optical isotropy, said second polarizing film includes a second polarizing layer and a second protective layer disposed between said second polarizing layer and said LC layer, and said second protective layer has a positive mono-axis anisotropy.

16. The transflective LCD device according to claim 15, wherein said second protective film has a retardation of 180 nm or smaller in a thickness direction thereof.

17. The transflective LCD device according to claim 15, wherein said second polarizing film has an optical transmission axis substantially parallel to said initial orientation of said LC layer.

18. The transflective LCD device according to claim 1, further comprising another retardation film between said retardation film and said polarizing film, wherein said first polarizing film includes a first polarizing layer and a first protective layer disposed between said first polarizing layer and said another retardation film.

19. The transflective LCD device according to claim 18, wherein said second polarizing film has an optical transistors axis substantially parallel to said initial orientation of said LC layer.

* * * * *